United States Patent [19]

Kitaguchi et al.

[11] Patent Number: 4,983,494

[45] Date of Patent: Jan. 8, 1991

[54] IMAGE FORMING PROCESS INCLUDING HEATING STEP

[75] Inventors: Hiroshi Kitaguchi; Masatoshi Kato, both of Kanagawa, Japan

[73] Assignee: Fuji Photo Film Co., Ltd., Kanagawa, Japan

[21] Appl. No.: 423,674

[22] Filed: Oct. 18, 1989

Related U.S. Application Data

[63] Continuation of Ser. No. 281,866, Dec. 6, 1988, abandoned, which is a continuation of Ser. No. 918,970, Oct. 15, 1986, abandoned.

[30] Foreign Application Priority Data

| | | | |
|---|---|---|---|
| Oct. 16, 1985 | [JP] | Japan | 60-230494 |
| Oct. 16, 1985 | [JP] | Japan | 60-230495 |
| Apr. 7, 1986 | [JP] | Japan | 61-79688 |
| Apr. 14, 1986 | [JP] | Japan | 61-85761 |
| Apr. 18, 1986 | [JP] | Japan | 61-89807 |

[51] Int. Cl.$^5$ .............................................. C03C 8/00

[52] U.S. Cl. .................................. 430/203; 430/351; 430/353; 430/617; 430/619; 430/957; 430/960

[58] Field of Search ............... 430/203, 353, 619, 617, 430/957, 960, 351, 223

[56] References Cited

U.S. PATENT DOCUMENTS

| | | | |
|---|---|---|---|
| 4,472,493 | 9/1984 | Okamura et al. | 430/957 X |
| 4,562,138 | 12/1985 | Uemura et al. | 430/219 |
| 4,584,257 | 4/1986 | Okamura et al. | 430/957 X |
| 4,612,277 | 9/1986 | Inagaki et al. | 430/233 |
| 4,639,408 | 1/1987 | Kitaguchi et al. | 430/351 |
| 4,677,051 | 6/1987 | Kubodera et al. | 430/550 |
| 4,678,735 | 7/1987 | Kitaguchi et al. | 430/203 |
| 4,708,927 | 11/1987 | Okamura et al. | 430/564 |

*Primary Examiner*—Paul R. Michl
*Assistant Examiner*—Lee C. Wright
*Attorney, Agent, or Firm*—Sughrue, Mion, Zinn, Macpeak & Seas

[57] ABSTRACT

An image is formed in a photographic element by a process comprising a step of heating a heat-developable photosensitive material in the presence of a specific compound which typically releases a phenylmercaptotetrazole having a substituted benzene ring and serving as a development retarder.

5 Claims, No Drawings

IMAGE FORMING PROCESS INCLUDING HEATING STEP

This is a continuation of application Ser. No. 281,866, filed Dec. 6, 1988 now abandoned which is a continuation of application Ser. No. 981,970 filed Oct. 15, 1986 now abandoned.

BACKGROUND OF THE INVENTION

This invention relates to an image forming process including a heating step, and more particularly, to a process for forming images by heating using a precursor of a development retarder.

Heat developable photosensitive materials and their image forming processes are well known in the art and described in the literature, inter alia, "Fundamentals of Photographic Engineering", Corona Publishing K.K., Tokyo, Japan (1979), pages 553–555; "Image Information", April 1978, page 40; and Nebletts Handbook of Photography and Reprography, 7th ed., Van Nostrand Reinhold Company, pages 32–33.

A number of methods have been proposed for producing color images through heat development, for example, a process for forming color images using a coupler as a dye-providing substance (see U.S. Pat. Nos. 3,531,286; 3,761,270; and 4,021,240; Belgian Patent No. 802,519; and Research Disclosure, September 1975, pages 31–32), a process of forming images using a dye having a nitrogen-containing heterocyclic group incorporated in its dye moiety as a dye-providing substance (see Research Disclosure, May 1978, pages 54–58, RD-16966), a process based on silver dye bleaching (see Research Disclosure, April 1976, pages 30–32-, RD-14433; ibid, December 1976, pages 14–15, RD-15227; and U.S. Pat. No. 4,235,957), and a process for forming a color image using a leuco dye (see U.S. Pat. Nos. 3,985,565 and 4,022,617).

These color image forming processes, however, have their own drawbacks and commonly suffer from the insufficient shelf storage of photosensitive material that the material deteriorates with a lapse of time as exemplified by increasing fog. Proposed as a solution of this problem is the use of a reducing dye-providing substance capable of releasing a hydrophilic dye as disclosed in Japanese Patent Application Kokai No. 58-58543. This proposal has succeeded in significantly overcoming the technical problems of the prior art processes.

Nevertheless, because of the absence of development inhibiting or retarding means, the aforementioned image forming processes based on heat development cannot avoid such problems as increasing fog due to overdevelopment and varying photographic performance due to varying heating temperature, and thus they are still difficult to always produce consistent images.

On the other hand, several development inhibiting techniques are known in the conventional diffusion transfer photography. For example, development inhibitor precursors and color diffusion transfer photographic materials using same are described in Japanese Patent Publication Nos. 60-19498 and 60-29709. These patents describe or suggest nowhere the application to heat developable photosensitive material. Quite unsatisfactory results could be obtained when the compounds disclosed in these patents are added to heat developable photosensitive material.

SUMMARY OF THE INVENTION

An object of the present invention is to provide a novel and improved image forming process including a heat step wherein the development process terminates at the point of optimum development, avoiding fogging due to overdevelopment and providing consistent photographic performance regardless of varying heating temperature.

According to the present invention, there is provided a process for forming an image comprising a step of heating in the presence of a compound having the general formula:

$$R-(SO_2-CH_2CH_2-S-A)_n \quad (I)$$

wherein n is an integer having a value of 1 or 2,

R represents a monovalent radical selected from the group consisting of a substituted or unsubstituted alkyl, cycloalkyl, aralkyl, and aryl radical when n is 1, and R represents a divalent linking radical when n is 2, and A represents a radical selected from the group consisting of a substituted or unsubstituted phenyl and nitrogen-containing heterocyclic radical, and two A's may be the same or different when n is 2.

More specifically, the divalent linking radical represented by R when n is 2 is selected from the group consisting of a phenylene radical, an alkylene radical, a radical having the formula:

$$-(CH_2)_p-\underset{|}{\overset{OH}{CH}}-(L-\overset{OH}{\underset{|}{CH}})_m-(CH_2)_q-$$

wherein L represents a bond or a substituted or unsubstituted divalent radical, p and q each are an integer of 1 or 2, and m is an integer of 0 or 1, and a radical having the formula:

$$-(CH_2)_u-\overset{R^1}{\overset{|}{CH}}-X^1-(L)_r-(X^2)_s-\underset{R^2}{\underset{|}{CH}}-(CH_2)_t-$$

wherein $R^1$ and $R^2$ are independently selected from a hydrogen atom and an alkyl radical having 1 to 4 carbon atoms, $X^1$ and $X^2$ are independently selected from an ester linkage, a substituted or unsubstituted amide linkage, and an ether linkage, u and t each are an integer of 0 to 3, and r and s each are an integer of 0 or 1.

DETAILED DESCRIPTION OF THE INVENTION

In a first preferred embodiment of the present invention, the image forming process include heating in the presence of a compound having the general formula (I—I):

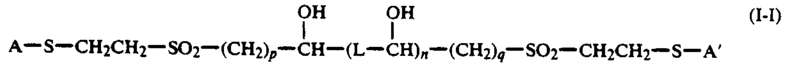

(I-I)

wherein A and A' may be the same or different and are individually selected from substituted or unsubstituted phenyl radicals and 5- or 6-membered nitrogen-containing heterocyclic radicals; L represents a single bond or a substituted or unsubstituted divalent radical; p and q each are an integer of 1 or 2; and n is an integer of 0 or 1.

The substituents on the phenyl radicals represented by A and A' in formula (I—I) include alkyl radicals (preferably, having 1 to 4 carbon atoms, for example, methyl and ethyl), alkoxy radicals (preferably, having 1 to 4 carbon atoms, for example, methoxy and ethoxy), nitro radical, halogen atoms (such as chloro), alkoxycarbonyl radicals (preferably the alkyl moiety having 1 to 4 carbon atoms, for example, methoxycarbonyl and ethoxycarbonyl), substituted or unsubstituted carbamoyl radicals (preferred substituents being alkyl radicals having 1 to 4 carbon atoms and phenyl radical), and substituted or unsubstituted sulfamoyl radicals (preferred substituents being alkyl radicals having 1 to 4 carbon atoms and phenyl radical).

The hetero ring of the nitrogen-containing heterocyclic radicals represented by A and A' in formula (I-I) may be fused to a benzene ring or replaced with commonly used substituents such as phenyl radical. Examples of the nitrogen-containing heterocyclic radicals include tetrazole rings such as tetrazole ring and phenyltetrazole ring; triazole rings such as benzotriazole ring and 1,2,4-triazole ring; diazole rings such as benzimidazole ring and imidazole ring; pyrimidine rings such as pyrimidine ring; monoazole rings such as benzothiazole ring and benzooxazole ring, and the like. Preferred are nitrogen-containing heterocyclic radicals having at least two heteroatoms such as tetrazole rings and diazole rings. Most preferred are phenyltetrazole ring and benzimidazole ring. Preferably, A and A' are the same.

The divalent radical represented by L in formula (I-I) is preferably selected from alkylene radicals having 1 to 10 carbon atoms, arylene radicals having 6 to 10 carbon atoms, divalent radicals of

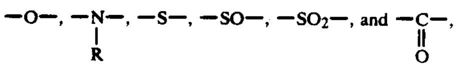

and a combination of two or more of these divalent radicals; wherein R represents a hydrogen atom, an alkyl radical having 1 to 10 carbon atoms (for example, methyl, ethyl, n-propyl, and n-butyl radicals), aryl radical having 6 to 10 carbon atoms (for example, phenyl radical), or an aralkyl radical having 7 to 10 carbon atoms (for example, benzyl radical). When L is not a single bond, these divalent radicals may be further substituted with a substituent such as alkyl and aryl radicals.

More particularly, preferred among the compounds of formula (I-I) are compounds having the general formula (I-II):

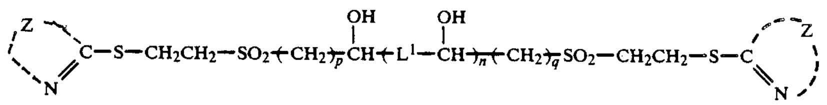

(I-II)

In formula (I-II), Z represents a group of nonmetallic atoms necessary to complete a 5- or 6-membered nitrogen-containing heterocyclic radical. The preferred nitrogen-containing heterocyclic radicals are tetrazole rings, and most preferably 1-phenyltetrazole rings.

The phenyl radical of the 1-phenyltetrazole ring may have a suitable substituent. The preferred substituents include

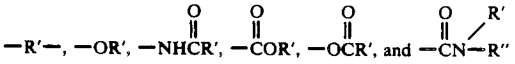

wherein R is typically a substituted or unsubstituted alkyl, cycloalkyl, aralkyl, or aryl radical and R is typically a hydrogen atom or a radical as defined for R. Particularly preferred substituents are —OR and —NHCOR. In these substituents, $R^1$ is preferably a substituted or unsubstituted alkyl or substituted or unsubstituted aryl radical, and most preferably a straight chain or branched alkyl having up to 30 carbon atoms, especially 3 to 20 carbon atoms.

In general formula (I-II), $L^2$, p, q, and n are as defined in formula (I-I). Preferably, p and q are equal to 1 and n is equal to 0. Preferably, $L^1$ is selected from alkylene radicals having 1 to 6 carbon atoms (for example, methylene, ethylene, trimethylene, and hexamethylene radicals), phenylene and xylylene radicals and these radicals combined with an ether linkage.

It is contemplated in the present invention that the compound of formula (I-I) releases a development retarder: A-SH(A'-SH) according to the following reaction scheme when heated.

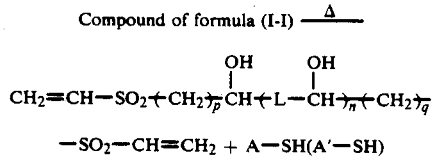

This reaction proceeds by itself during heat development, but is accelerated with a supply of a base. It is thus very advantageous to combine the compound of the present invention with a base or base precursor.

The compounds of formula (I-I) are characterized by the presence of at least one hydroxyl radical. The presence of hydroxyl radical contributes to an improved development inhibiting effect particularly when p=q=1. The development retarder precursors having a hydroxyl substituent are disclosed nowhere in the afore-mentioned Japanese Patent Publication Nos. 60-19498 and 60-29709. Such a development inhibiting effect in heat developable photosensitive material are quite unexpected.
Some preferred, non-limiting examples of the compounds of general formula (I-I) are given below.
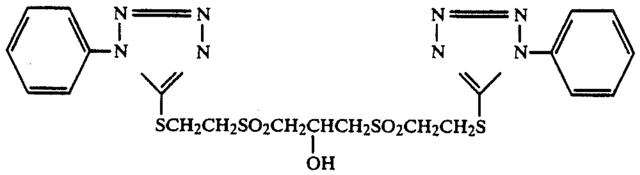
Compound No. 101
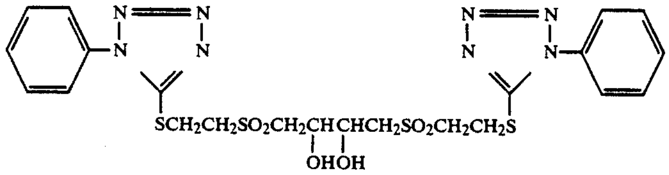
Compound No. 102
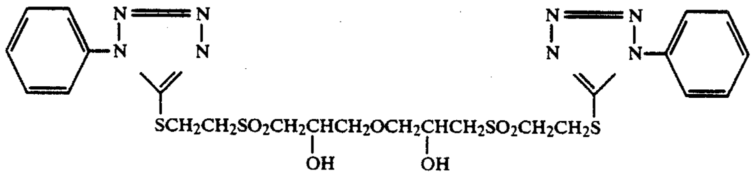
Compound No. 103
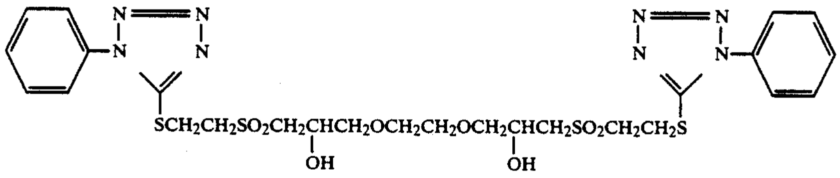
Compound No. 104
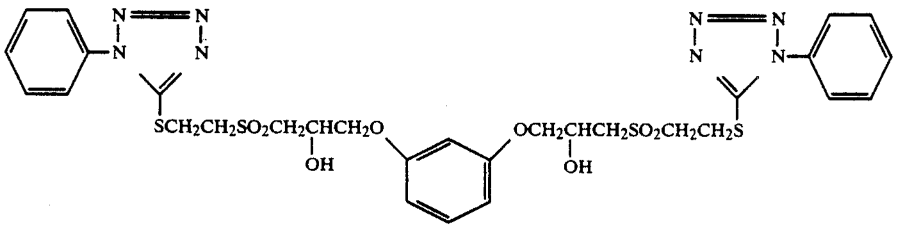
Compound No. 105
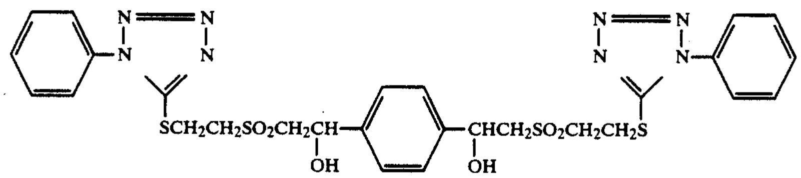
Compound No. 106
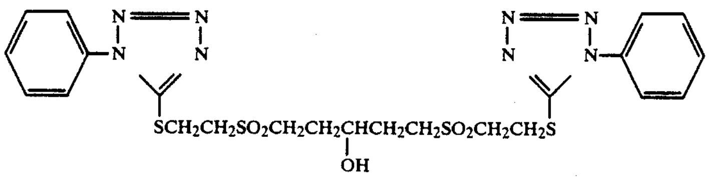
Compound No. 107
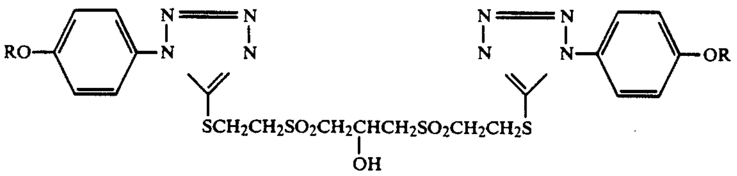
Compound No. 108

-continued wherein —R = —$CH_3$

Compound No. 109
Compound No. 108 wherein —R=—n—$C_4H_9$
Compound No. 110
Compound No. 108 wherein —R=—n—$C_6H_{13}$
Compound No. 111
Compound No. 108 wherein —R=—n—$C_8H_{17}$
Compound No. 112
Compound No. 108 wherein —R=—n—$C_{10}H_{21}$
Compound No. 113
Compound No. 108 wherein —R=—n—$C_{12}H_{25}$
Compound No. 114
Compound No. 108 wherein —R=—n—$C_{14}H_{29}$
Compound No. 115
Compound No. 108 wherein —R=—n—$C_{16}H_{33}$
Compound No. 116
Compound No. 108 wherein —R=—$CH_2CH_2OCH_3$ Compound No. 117

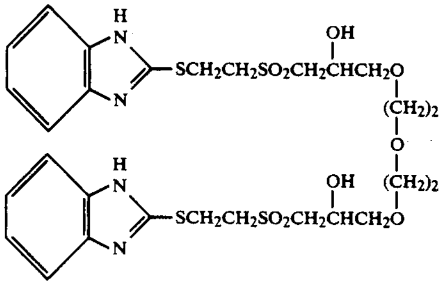

Compound No. 118

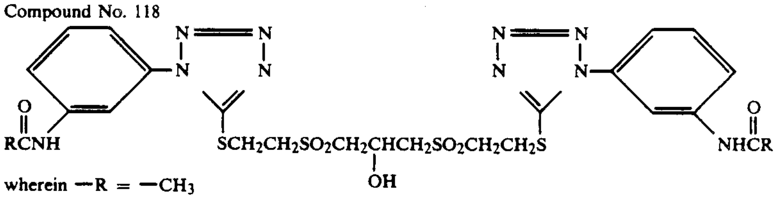

wherein —R = —$CH_3$

Compound No. 119
Compound No. 118 wherein —R = -n-$C_3H_7$
Compound No. 120
Compound No. 118 wherein —R = -i-$C_3H_7$
Compound No. 121
Compound No. 118 wherein —R = -n-$C_4H_9$
Compound No. 122
Compound No. 118 wherein —R = -n-$C_5H_{11}$
Compound No. 123

Compound No. 118 wherein —R = 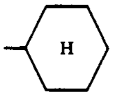

Compound No. 124
Compound No. 118 wherein —R = -n-$C_7H_{15}$
Compound No. 125

Compound No. 118 wherein —R = $-\underset{|}{\overset{C_2H_5}{CH}}$-n-$C_4H_9$

Compound No. 126
Compound No. 118 wherein —R = -n-$C_9H_{19}$
Compound No. 127
Compound No. 118 wherein —R = -n-$C_{11}H_{23}$
Compound No. 128
Compound No. 118 wherein —R = -n-$C_{13}H_{27}$
Compound No. 129
Compound No. 118 wherein —R = -n-$C_{15}H_{31}$
Compound No. 130
Compound No. 118 wherein —R = -n-$C_{17}H_{35}$
Compound No. 131

-continued

Compound No. 118 wherein —R = 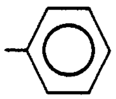

Compound No. 132

Compound No. 118 wherein —R = 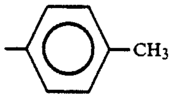

Compound No. 133

Compound No. 118 wherein —R = 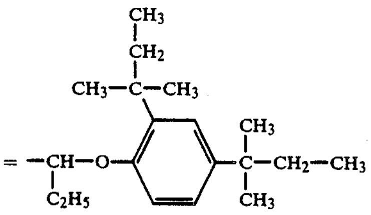

These compounds are generally synthesized by adding a thiol of formula (I-IV) to a compound having two vinylsulfonyl radical per molecule and represented by formula (I-III).

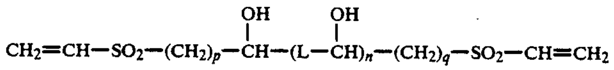

(I-III)

A—SH (I-IV)

In formulae (I-III) and (I-IV), A, L, p, q, and n are as defined for formula (I-I). The compounds having two vinylsulfonyl radical per molecule as represented by formula (I-III) are well known in the photographic art as a hardener for gelatin binder and their preparation is detailed, for example, in Japanese Patent Publication No. 50-358067; Japanese Patent Application Kokai Nos. 53-41221, 54-30002, 53-57257; and U.S. Patent No. 3,642,486. Inter alia, Japanese Patent Application Kokai No. 53-57257 describes the synthesis of a compound having a hydroxy radical as represented by formula (I-III).

Some examples of synthesis of the present compounds by addition reaction of thiol of formula (I-IV) to compound of formula (I-III) are presented below.

Synthesis 1

Synthesis of compound No. 101

To 1,3-bis(vinylsulfonyl)-2-propanol (24 grams) were added 1-phenyl-5-mercaptotetrazole (36 grams), sodium acetate (15 grams) and acetic acid (200 ml). The mixture was stirred at 60° C. for 3 hours. The reaction solution was poured into methanol (1 liter) whereupon crystals precipitated. The crystal precipitate was filtered off and recrystallized from acetone (1 liter), yielding compound No. 101. Yield 30 grams, m.p. 144° C. The structure of the compound was identified by NMR and IR spectra.

Synthesis 2

Synthesis of compound No. 119

The procedure of Synthesis 1 was repeated except that the 1-phenyl-5-mercaptotetrazole was replaced by 1-(m-butyrylaminophenyl)-5-mercaptotetrazole (53.2 grams). There was obtained Compound No. 119 in a yield of 263.2 grams. m.p. 153°-155° C.

Synthesis 3

Synthesis of compound No. 125

To 1,3-bis(vinylsulfonyl)-2-propanol (43.2 grams) were added 1-(m-ethylhexanoylaminophenyl)-5-mercaptotetrazole (120 grams), sodium acetate (30 grams) and acetic acid (400 ml). The mixture was stirred at 60° C. for 2½ hours. The reaction solution was poured into water (1.5 liters) whereupon crystals precipitated. The precipitate was extracted with ethyl acetate. The ethyl acetate layer was washed with water and salt water, and dried with sodium sulfate, and the solvent distilled off under vacuum. Methanol (600 ml) was added to the residue and the solution cooled. The resulting crystal precipitate was filtered off, yielding compound No. 125. Yield 114.5 grams, m.p. 155°-157° C.

Synthesis 4

Synthesis of compound No. 122

To 1,3-bis(vinylsulfonyl)-2-propanol (18 grams) were added 1-(n-caproylaminophenyl)-5-mercaptotetrazole (44.5 grams), sodium acetate (12.3 grams), acetic acid (175 ml), and N,N-dimethylformamide (25 ml). The mixture was stirred at 75°-78° C. for 4 hours. Methanol (250 ml) and water (25 ml) were added to the reaction solution, which was cooled to 8° C. The resulting crystal precipitate was filtered off and recrystallized from a solvent mixture of ethanol (350 ml), N,N-dimethylformamide (50 ml), and water (35 ml), yielding compound No. 122. Yield 50.5 grams, m.p. 167° C.

Synthesis 5

Synthesis of compound No. 127

To 1,3-bis(vinylsulfonyl)-2-propanol (7.93 grams) were added 1-(n-lauroylaminophenyl)-5-mercaptotetrazole (25.1 grams), sodium acetate (5.5 grams), acetic acid (150 ml), and DMF (17 ml). The mixture was stirred at 75°-78° C. for 5 hours and crystals precipitated during stirring. Methanol (150 ml) was added to the reaction solution, which was cooled to 5° C. The resulting crystal precipitate was filtered off (30.3 grams). It was recrystallized from a solvent mixture of acetone (150 ml) and DMF (38 ml), yielding compound No. 127. Yield 25.3 grams, m.p. 164°-166° C.

Synthesis 6

Synthesis of compound No. 129

The procedure of Synthesis 5 was repeated except that the 1-(n-lauroylaminophenyl)-50mercaptotetrazole was replaced by 1-(n-palmitoylaminophenyl)-5-mercaptotetrazole (28.8 grams). There was obtained Compound No. 129 in a yield of 28.6 grams. m.p. 171°-172° C.

In a second preferred embodiment of the present invention, the image forming process include heating in the presence of a compound having the general formula (II-I):

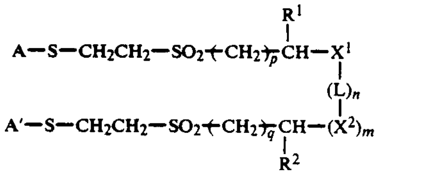
(II-I)

wherein A and A' may be the same or different and are individually selected from a substituted or unsubstituted phenyl radical and a 5- or 6-membered nitrogen-containing heterocyclic radical;

$R^1$ and $R^2$ may be the same or different and are individually selected from a hydrogen atom and an alkyl radical having 1 to 4 carbon atoms;

p and q each are an integer of 0 to 3 and may be the same or different;

$X^1$ and $X^2$ may be the same or different and individually selected from an ester linkage, a substituted or unsubstituted amide linkage including a sulfonamide linkage, and an either linkage;

L is selected from an alkylene, phenylene, and xylylene radical;

when $X^1$ and $X^2$ are amide linkages, the substituents on the nitrogen may be bonded to form a heterocyclic ring together with parts of L, $X^1$, and $X^2$, and n and m each are an integer of 0 or 1.

The substituents on the phenyl radicals represented by A and A' in formula (II-I) include alkyl radicals (preferably, having 1 to 4 carbon atoms, for example, methyl and ethyl), alkoxy radicals (preferably, having 1 to 4 carbon atoms, for example, methoxy and ethoxy), nitro radical, halogen atoms (such as chloro), alkoxycarbonyl radicals (preferably the alkyl moiety having 1 to 4 carbon atoms, for example, methoxycarbonyl and ethoxycarbonyl), substituted or unsubstituted carbamoyl radicals (preferred substituents being alkyl radicals having 1 to 4 carbon atoms and phenyl radical), and substituted or unsubstituted sulfamoyl radicals (preferred substituents being alkyl radicals having 1 to 4 carbon atoms and phenyl radical).

The hetero ring of the nitrogen-containing heterocyclic radicals represented by A and A' in the formula (II-I) may be fused to a benzene ring or replaced with commonly used substituents such as phenyl radical. Examples of the nitrogen-containing heterocyclic radicals include tetrazole rings such as tetrazole ring and phenyltetrazole ring; triazole rings such as benzotriazole ring and 1,2,4-triazole ring; diazole rings such as benzimidazole ring and imidazole ring; pyrimidine rings such as pyrimidine ring; monoazole rings such as benzothiazole ring and benzooxazole ring, and the like. Preferred are nitrogen-containing heterocyclic radicals having at least two heteroatoms such as tetrazole rings and diazole rings. Most preferred are phenyltetrazole ring and benzimidazole ring. Preferably, A and A' are the same.

The alkyl radicals represented by $R^1$ and $R^2$ include methyl, ethyl, n-propyl, iso-propyl, n-butyl, sec-butyl, and tert-butyl radicals.

When $X^1$ and $X^2$ are amide linkages, they may have a substituent attached to the nitrogen, for example, an alkyl and aryl radical. The heterocyclic ring which L forms together with parts of $X^1$ and $X^2$ may be substituted or unsubsituted. Examples of the heterocyclic ring include perhydrotriazine ring, imidazoline ring, piperadine ring and perhydropyrimidine ring. Particularly among them, the perhydrotriazine ring may be substituted, typically with a substituent of the formula:

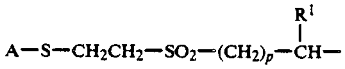

wherein A, R1 and p are as defined above.

More particularly, preferred among the compounds of formula (II-I) are compounds having the general formula (II-II):

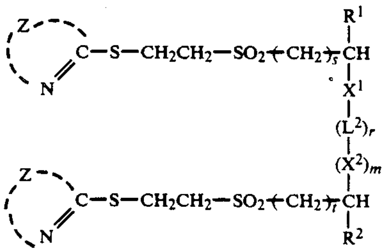
(II-II)

In formula (II-II), Z represents a group of nonmetallic atoms necessary to complete a 5- or 6-membered nitrogen-containing heterocyclic radical. The preferred nitrogen-containing heterocyclic radicals are tetrazole rings and diazole rings, and most preferably 1-phenyltetrazole ring and benzimidazole ring.

The phenyl radical of the 1-phenyltetrazole ring may have a suitable substituent. The preferred substituents include

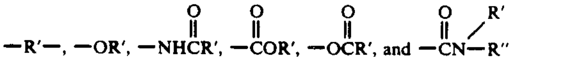

wherein R is typically a substituted or unsubstituted alkyl, cycloalkyl, aralkyl, or aryl radical and R is typically a hydrogen atom or a radical as defined for R. Particularly preferred substituents are —OR and —NHCOR. In these substituents, R is preferably a substituted or unsubstituted alkyl or substituted or unsubstituted aryl radical, and most preferably a straight chain or branched alkyl having up to 30 carbon atoms, especially 3 to 20 carbon atoms.

In general formula (II-II), R, R, $X^1$, $X^2$, L and m, are as defined in formula (II-I) and r has the same meaning as n is has the same meaning as p and t has the same meaning as q. Preferably, s and t are equal to 0 or 1 and R and R are hydrogen atoms or methyl radicals. Preferably, L is selected from an alkylene radical having 1 to 6 carbon atoms (for example, methylene, ethylene, trimethylene, and hexamethylene radicals), phenylene, and xylylene radical.

Preferably, $X^1$ and $X^2$ are selected from an amide and ether linkage. Preferably both n and m are equal to 1, when both $X^1$ and $X^2$ are amide linkages.

Particularly preferred are compounds of the following general formula (II-III):

(II-III)

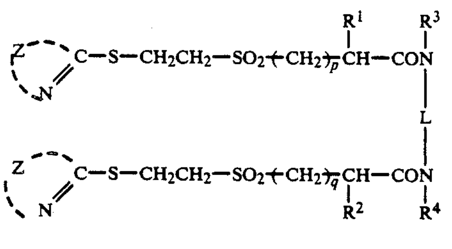

wherein Z, $R^1$, $R^2$, L, p, and q are as defined for formula (II-II), $R^3$ and $R^4$ are individually selected from a hydrogen atom, alkyl radical having 1 to 4 carbon atoms (for example, methyl, ethyl, isopropyl, and butyl radicals), and phenyl radical. $R^3$ and $R^4$ may be mutually combined to form a heterocyclic ring together with L and the two adjacent nitrogen atoms.

More preferred examples included within the scope of the above formula are compounds of the following general formula (II-IV). Preferred examples of these compounds wherein the heterocyclic ring is further substituted are also given below by the general formula (II-V).

Preferably p=q in the foregoing formulae (II-I to IV) and (II-VI), and p=q=r in the foregoing formula (II-V).

It is contemplated in the present invention that the compound of formula (II-I) releases a development retarder: A-SH(A'-SH) according to the following reaction scheme when heated.

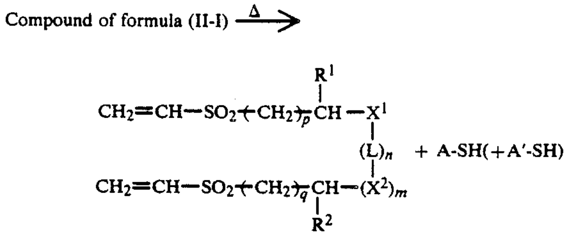

This reaction proceeds by itself during heat development, but is accelerated with a supply of a base. It is thus very advantageous to combine the compound of the present invention with a base or base precursor.

The compounds of formula (II-I) are disclosed in Japanese Patent Application Kokai No. 59-105640 as being solely used in color diffusion transfer photography. The laid-open specification contains no suggestion about the possible application of these compounds to heat-developable photosensitive material. Also lacking is the description or teaching that the compounds release mercaptoazoles which are compounds having a long chain acylamino or long chain alkoxy radical.

Because of mercaptoazole release, the compounds of formula (II-I) are advantageous particularly when a process of generating a base by mixing a difficultly (IV)

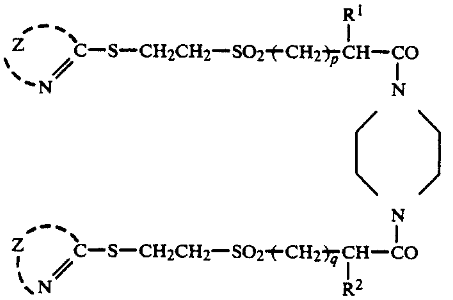

(V)

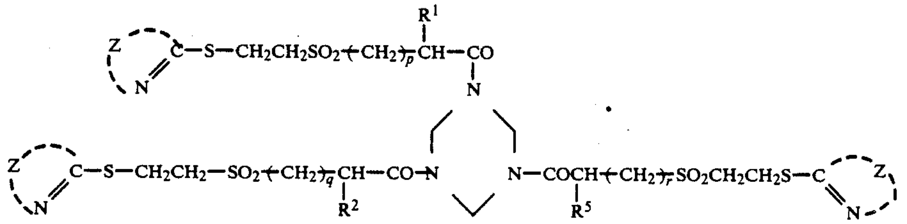

In formulae (II-IV) and (II-V), Z, $R^1$, $R^2$, p, and q are as defined for formula (II-II), r is equal to 0 or 1, and $R^5$ represents hydrogen atom or methyl.

When $X^1$ represents an ether linkage, desirably both n and m are equal to 0. Particularly preferred are those compounds of the general formula (II-VI):

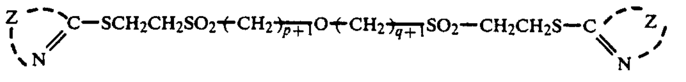

wherein Z, p, and q are as defined for formula (II-II).

soluble metal compound with a compound capable of complexing with the metal ion of the difficultly soluble metal compound (as will be described later) is applied to a photosensitive material containing the present compound.

Some preferred, no-limiting examples of the compounds of general formula (II-I) are given below.

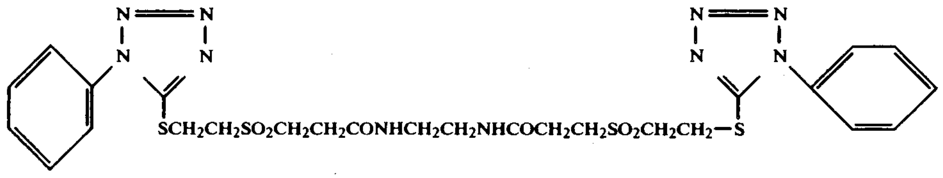
Compound No. 201
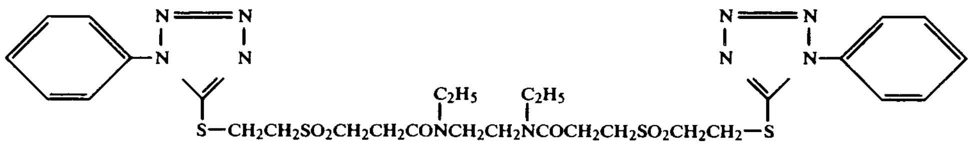
Compound No. 202
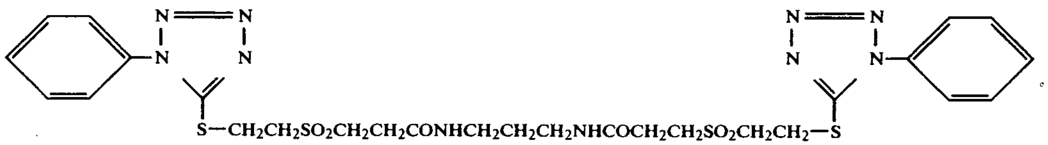
Compound No. 203
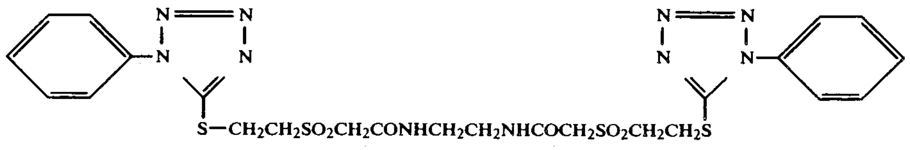
Compound No. 204
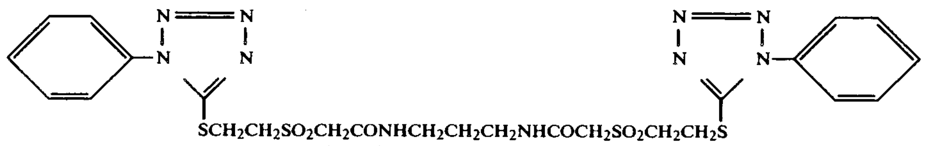
Compound No. 205
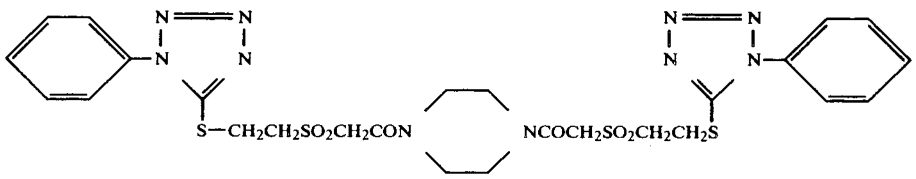
Compound No. 206

-continued
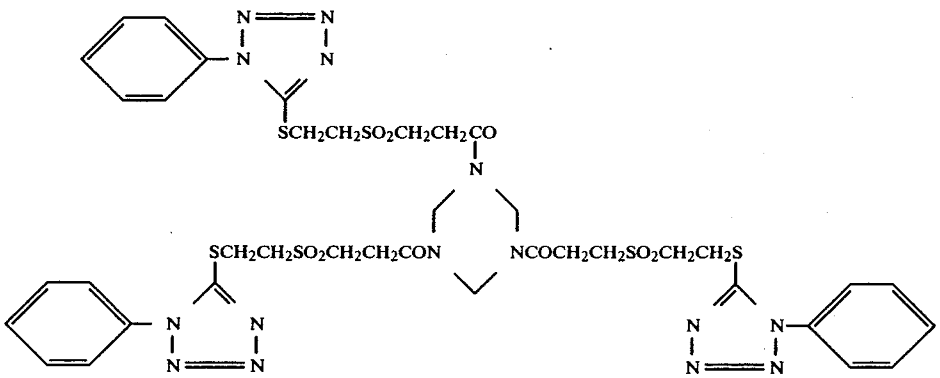
Compound No. 207
Compound No. 208
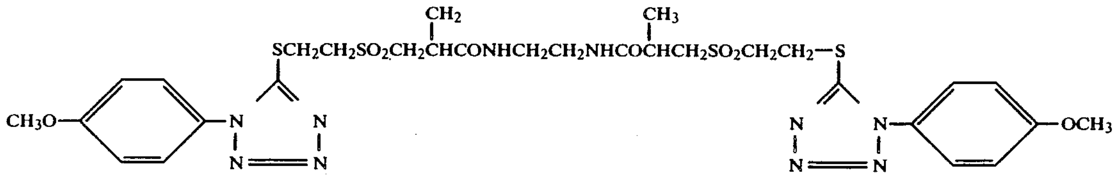
Compound No. 209
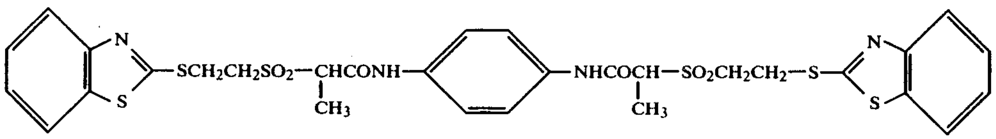
Compound No. 210
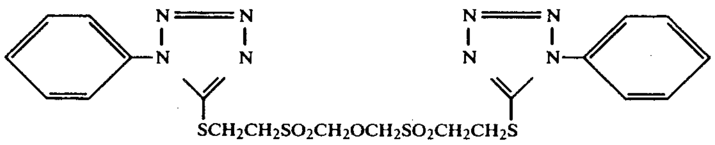
Compound No. 211

-continued
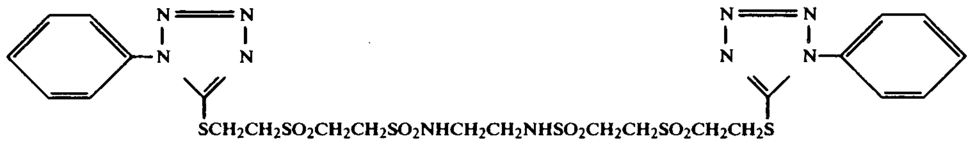
Compound No. 212
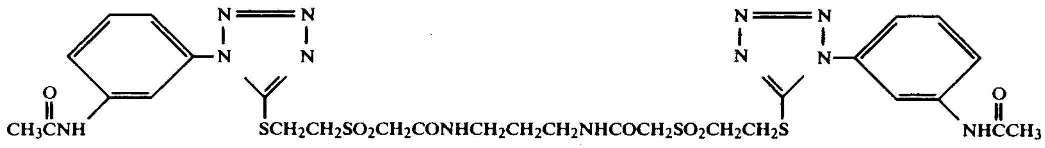
Compound No. 213
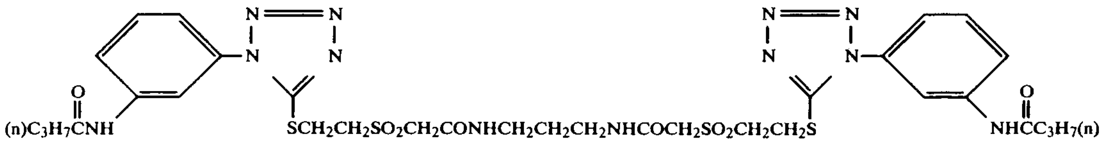
Compound No. 214
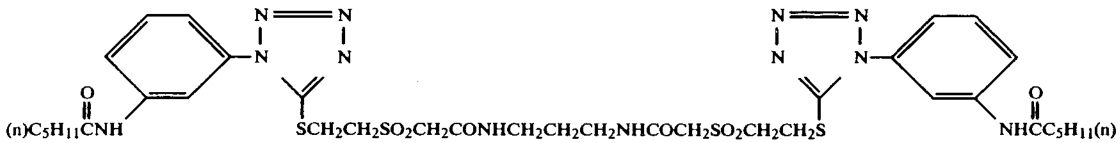
Compound No. 215
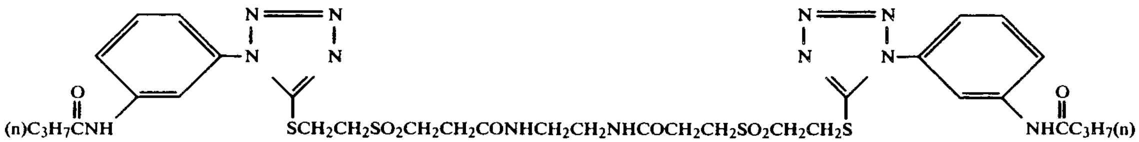
Compound No. 216
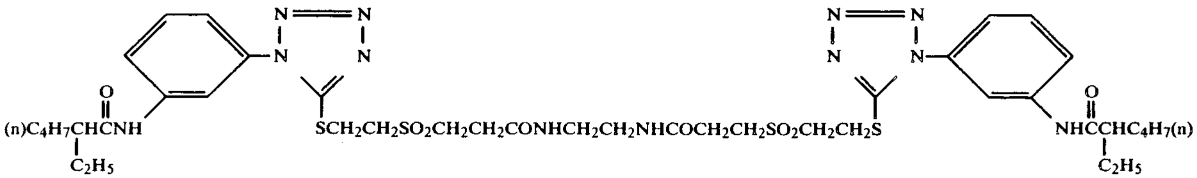
Compound No. 217

-continued
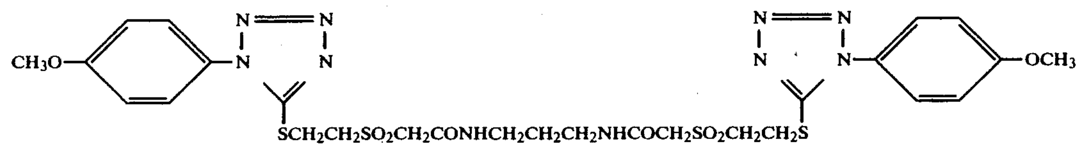
Compound No. 218
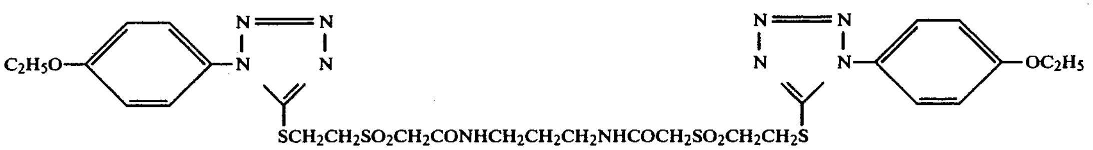
Compound No. 219
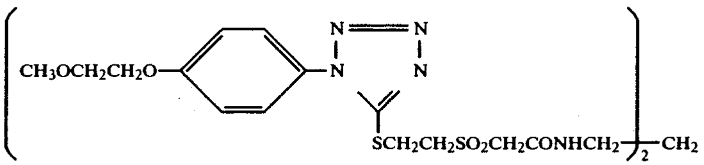
Compound No. 220
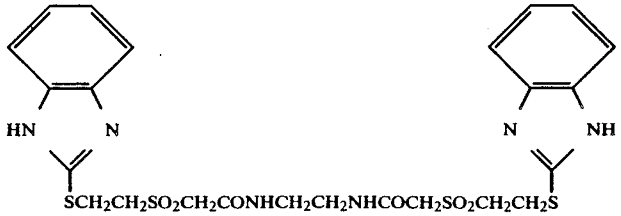
Compound No. 221
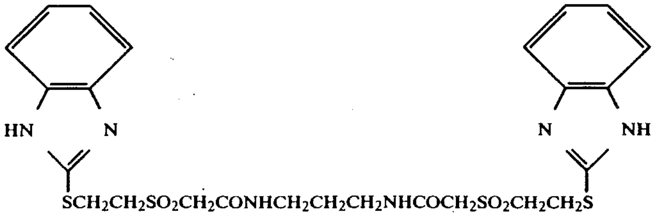
Compound No. 222

-continued

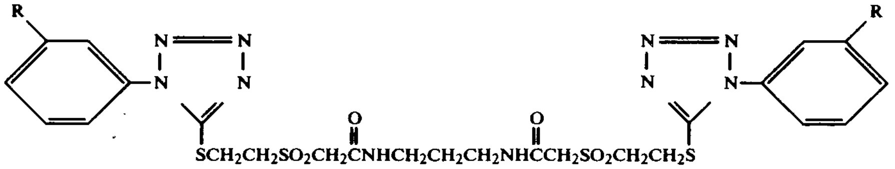

Compound No. 223 wherein $-R = -NH\overset{\overset{O}{\|}}{C}C_7H_{15}(n)$

Compound No. 233 wherein $-R = -NH\overset{\overset{O}{\|}}{C}\text{-n-}C_9H_{19}$ Compound No. 224

Compound No. 223 wherein $-R = -NH\overset{\overset{O}{\|}}{C}\text{-n-}C_{11}H_{23}$ Compound No. 225

Compound No. 223 wherein $-R = -NH\overset{\overset{O}{\|}}{C}\text{-n-}C_{13}H_{27}$ Compound No. 226

Compound No. 223 wherein $-R = -NH\overset{\overset{O}{\|}}{C}\text{-n-}C_{15}H_{31}$ Compound No. 227

Compound No. 223 wherein $-R = -NH\overset{\overset{O}{\|}}{C}\text{-n-}C_{17}H_{35}$ Compound No. 228

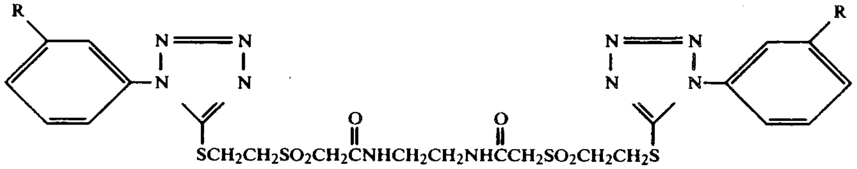

Compound No. 229 wherein $-R = -NH\overset{\overset{O}{\|}}{C}\text{-n-}C_{11}H_{23}$

Compound No. 229 wherein $-R = -NH\overset{\overset{O}{\|}}{C}\text{-n-}C_{13}H_{27}$ Compound No. 230

Compound No. 229 wherein $-R = -NH\overset{\overset{O}{\|}}{C}\text{-n-}C_{15}H_{31}$ Compound No. 231

-continued
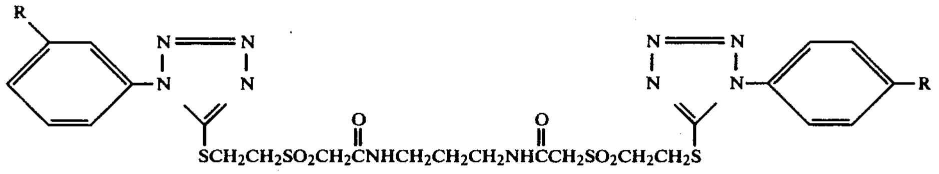
Compound No. 232
wherein —R = -n-$C_{12}H_{25}$
Compound No. 232 wherein —R = —O-n-$C_{14}H_{29}$ Compound No. 233
Compound No. 232 wherein —R = —O-n-$C_{16}H_{33}$ Compound No. 234

These compounds can be synthesized by the method described in the aforementioned Japanese Patent Application Kokai No. 59-105640. Some examples of sythesis of these compounds are presented below.

Synthesis 21

Synthesis of compound No. 203

To 1,3-bis(vinylsulfonylacetamide)propane (6.1 grams) were added 1-phenyl-5-mercaptotetrazole (7.1 grams), sodium acetate (3.2 grams) and acetic acid (30 ml). The mixture was stirred at 60° C. for 2 hours. Ethyl acetate (63 ml) and water (27 ml) were added to the reaction solution, which was cooled with ice. The resulting crystal precipitate was filtered off and recrystallized from acetone (45 ml), yielding compound No. 203. Yield.7.6 grams, 61% of the theory, m.p. 75°-78° C.

Synthesis 22

Synthesis of compound No. 220

The procedure of Synthesis 21 was repeated except that the 1-phenyl-5-mercaptotetrazole was replaced by 1-(p-methoxyethoxyphenyl)-5-mercaptotetrazole (9.16 grams). There was obtained compound No. 220 in a yield of 10.84 grams. Yield 74%, m.p. 85°-88° C.

Synthesis 23

Synthesis of compound No. 225

To 1,3-bis(vinylsulfonylacetamide)propane (10.15 grams) were added 1-(m-lauroylaminophenyl)-5-mercaptotetrazole (23.6 grams), sodium acetate (5 grams) and acetic acid (100 ml). The mixture was stirred at 75° C. for 5 hours. Methanol (100 ml) was added to the reaction solution, which was cooled. The resulting crystal precipitate was filtered off and recrystallized from a solvent mixture of acetone (250 ml), methanol (200 ml), and DMF (40 ml), yielding compound No. 225. Yield 26.1 grams, 80% of the theory, m.p. 138°-139° C.

Synthesis 24

Synthesis of compound No. 227

The procedure of Synthesis 23 was repeated except that the 1-(m-lauroylaminophenyl)-5-mercaptotetrazole was replaced by 1-(m-palmitoylaminophenyl)-5-mercaptotetrazole (26.8 grams). The resulting crude crystals were recrystallized from a solvent mixture of acetone (300 ml), methanol (100 ml), and DMF (130 ml), yielding compound No. 227. Yield 29.6 grams, 82% of the theory, m.p. 167°-168° C.

In a third preferred embodiment of the present invention, the image forming process include heating in the presence of a compound having the general formula (III-I):

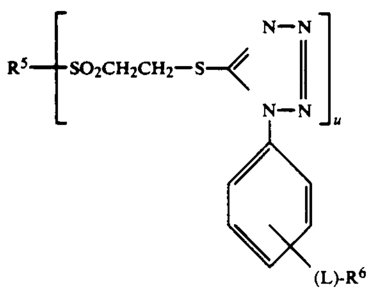

(III-I)

wherein u is an integer of 1 or 2, $R^5$ represents a substituted or unsubstituted alkyl, cycloalkyl, aralkyl, or aryl radical when u is 1, and $R^5$ represents a substituted or unsubstituted phenylene or alkylene radical when u is 2, $R^6$ represents a substituted or unsubstituted alkyl having at least 3 carbon atoms, cycloalkyl, aralkyl, or aryl radical, and —(L)— represents a single bond or

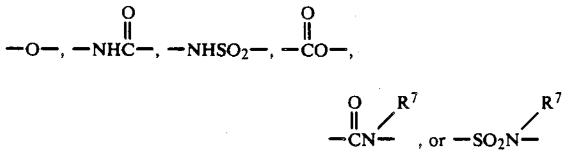

wherein $R^7$ is selected from a hydrogen atom and the radicals defined for $R^6$ and may be the same as or different from $R^6$.

When u is equal to 1, the alkyl radicals represented by $R^5$ include straight chain or branched alkyl radicals having 1 to 18 carbon atoms, for example, ethyl, n-propyl, n-butyl, n-hexyl, n-heptyl, 2-ethylhexyl, n-decyl, and n-dodecyl. These alky radicals may be substituted with such a substituent as halo, alkoxy, cyano, and substituted or unsubstituted carbamoyl radicals.

The cycloalkyl radicals represented by $R^5$ include 5-or 6-membered cycloalkyl radicals having 5 to 10 carbon atoms. Typical examples are cyclopentyl and cyclohexyl radicals. The aralkyl radicals represented by $R^5$ include benzyl and $\beta$-phenetyl radicals.

The aryl radicals represented by $R^5$ are preferably aryl radicals having 6 to 18 carbon atoms, for example, phenyl, naphthyl, and anthryl radicals. The aryl radicals may be substituted with such a substituent as substituted or unsubstituted alkyl, substituted or unsubstituted alkoxy, substituted or unsubstituted aryl, halo, alkyl- or aryl-disubstituted amino, acyl amino, sulfonyl amino, cyano, nitro, alkyl or aryl sulfonyl, oxycarbonyl, carbonyloxy, substituted or unsubstituted carbamoyl, and substituted or unsubstituted sulfamoyl radicals.

When u is equal to 2, the phenylene radical represented by $R^5$ may vary in para-, meta-, and ortho-forms and be substituted with the same substituents as defined for the phenyl radicals represented by $R^5$ when u=1.

The alkylene radicals represented by $R^5$ include methylene, ethylene, propylene, and butylene radicals. They may be substituted with the same substituents as defined for the alkyl radicals represented by $R^5$ when u=1.

Preferably, u is equal to 1 and $R^5$ is a substituted or unsubstituted alkyl or aryl radical. More preferably $R^5$ are substituted or unsubstituted aryl radicals, and most preferably phenyl radicals having at least one electron attractive group (for example, nitro, halo, alkyl or aryl sulfonyl, substituted or unsubstituted carbamoyl or sulfamoyl, cyano, and oxycarbonyl group).

The alkyl radicals represented by $R^6$ include straight chain or branched alkyl radicals having at least 3 carbon atoms, preferably 3 to 30 carbon atoms, and most preferably 5 to 20 carbon atoms. Typical examples are n-propyl, i-propyl, n-butyl, i-butyl, n-pentyl, n-hexyl, n-heptyl, n-octyl, 2-ethylhexyl, 1-ethylpentyl, n-nonyl, n-decyl, n-undecyl, n-dodecyl, n-tridecyl, n-tetradecyl, n-pendadecyl, n-hexadecyl, n-heptadecyl, n-octadecyl, 1-heptyloctyl, and 2-heptylnonyl radicals.

The cycloalkyl radicals represented by $R^6$ include cyclopentyl and cyclohexyl radicals.

The aralkyl radicals represented by $R^6$ include benzyl and phenetyl radicals.

The aryl radicals represented by $R^6$ are, for example, phenyl, naphthyl, and anthryl radicals. The aryl radicals may be substituted with such a substituent as defined for $R^5$.

Preferably, $R^6$ is a substituted or unsubstituted alkyl or aryl radical, and most preferably a straight chain alkyl radical.

Preferred among the radicals represented by —(L)— are —O—, —NHCO—, —$NHSO_2$—. More particularly, —O— may be attached at the para position, and —NHCO— and —$NHSO_2$— may be attached at the meta position position with respect to the nitrogen atom of the tetrazole ring.

The preferred compounds of general formula (III-I) are those represented by the following formula:

(III-II)

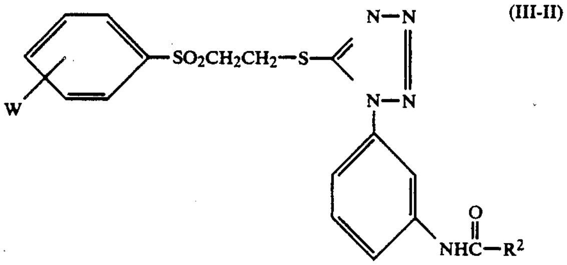

wherein W is an electron attractive group and $R^2$ is a straight chain alkyl.

It is contemplated in the present invention that the compound of formula (III-I) releases a development retarder of formula (III-IV) according to the following reaction scheme when heated.

Compound of formula (III-I)

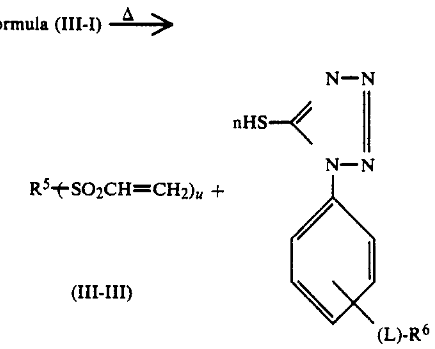

(III-III) (III-IV)

This reaction proceeds by itself during heat development, but is accelerated with a supply of a base. It is thus very advantageous to combine the compound of the present invention with a base or base precursor.

The compounds of formula (III-I) are characterized in that the released development retarder of formula (III-IV) has —(L)—$R^6$. Analoguous compounds are disclosed in the afore-mentioned Japanese Patent Publication Nos. 60-19498 and 60-29709. In all the compounds described therein, the benzene ring attached to the tetrazole ring at its 1-position is unsubstituted. These patent publications refer nowhere to heat-developable photosensitive material. Furthermore, as will be illustrated in Examples, the application of the compounds described in these patent publications to a system as used in the present invention is little effective. The present invention becomes effective only when the compounds having —(L)—$R^2$ are defined by the general formula are applied to heat-developable photosensitive material This is quite unexpected from the prior art knowledge.

Some preferred, non-limiting examples of the compounds of general formula (III-I) are given below.

Compound No. 301

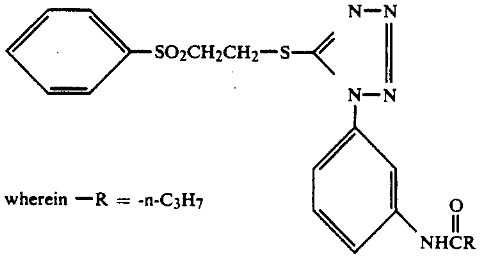

wherein —R = -n-$C_3H_7$

Compound No. 302
Compound No. 301 wherein —R = -n-$C_5H_{11}$
Compound No. 303
Compound No. 301 wherein —R = -n-$C_7H_{15}$
Compound No. 304
Compound No. 301 wherein —R = -n-$C_{11}H_{23}$
Compound No. 305
Compound No. 301 wherein —R = -n-$C_{15}H_{31}$ -continued Compound No. 306

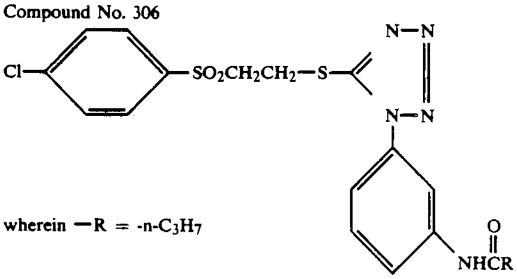

wherein —R = -n-$C_3H_7$

Compound No. 307

Compound No. 306 wherein —R = -n-$C_5H_{11}$

Compound No. 308

Compound No. 306 wherein —R = 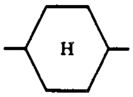

Compound No. 309

Compound No. 306 wherein —R = 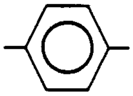

Compound No. 310

Compound No. 306 wherein —R = -n-$C_7H_{15}$

Compound No. 311

$C_2H_5$
Compound No. 306 wherein —R = —CH-n-$C_4H_9$

Compound No. 312

Compound No. 306 wherein —R = -n-$C_9H_{19}$

Compound No. 313

Compound No. 306 wherein —R = -n-$C_{11}H_{23}$

Compound No. 314

Compound No. 306 wherein —R = -n-$C_{13}H_{27}$

Compound No. 315

Compound No. 306 wherein —R = -n-$C_{15}H_{31}$

Compound No. 316

Compound No. 306 wherein —R = -n-$C_{17}H_{35}$

Compound No. 317

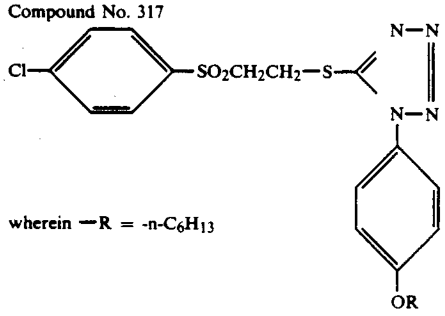

wherein —R = -n-$C_6H_{13}$

Compound No. 318

Compound No. 317 wherein —R = -n-$C_8H_{17}$

Compound No. 319

Compound No. 317 wherein —R = -n-$C_{12}H_{25}$

Compound No. 320

Compound No. 317 wherein —R = -n-$C_{16}H_{33}$

Compound No. 321

Compound No. 317 wherein —R = —$CH_2CH_2OCH_3$

-continued
Compound No. 322
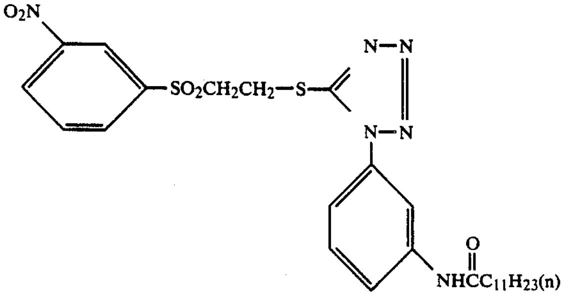
Compound No. 323
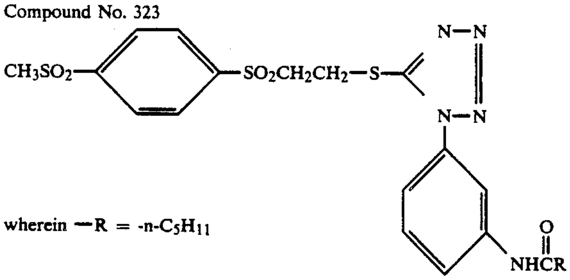
wherein —R = -n-$C_5H_{11}$
Compound No. 324
Compound No. 323 wherein —R = -n-$C_9H_{19}$
Compound No. 325
Compound No. 323 wherein —R = -n-$C_{11}H_{23}$
Compound No. 326
Compound No. 323 wherein —R = -n-$C_{13}H_{27}$
Compound No. 327
Compound No. 323 wherein —R = -n-$C_{15}H_{31}$
Compound No. 328
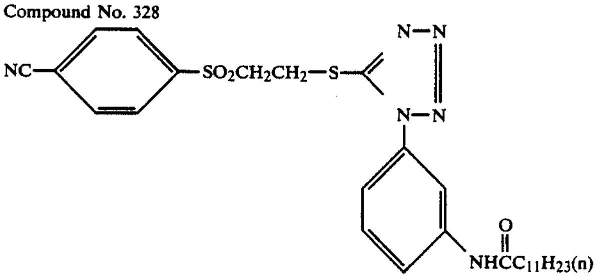
Compound No. 329
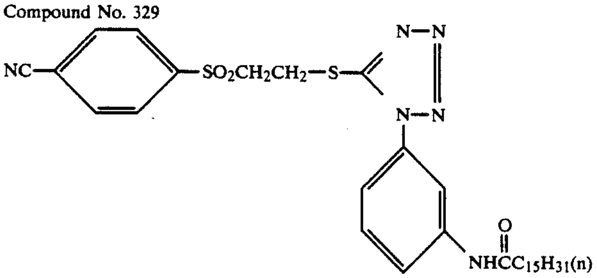
Compound No. 330
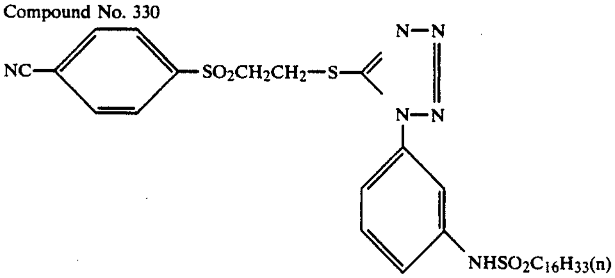

-continued
Compound No. 331
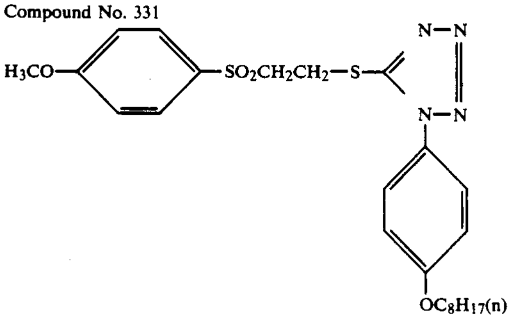
Compound No. 332
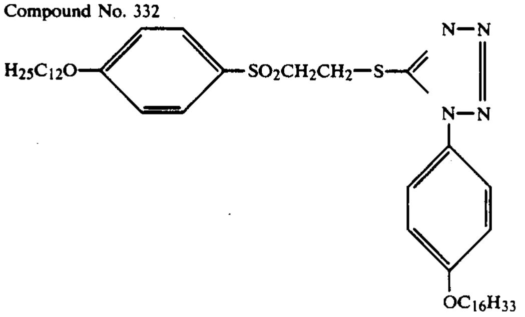
Compound No. 333
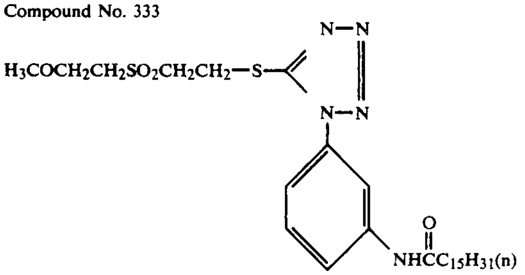
Compound No. 334
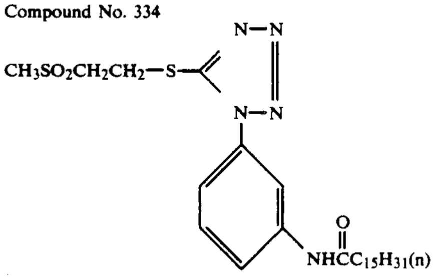
Compound No. 335
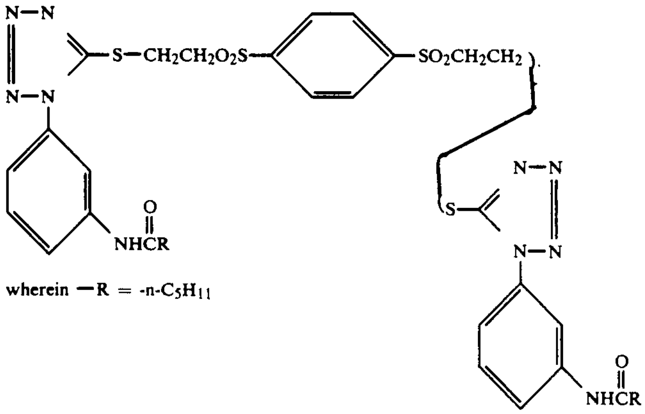
wherein —R = -n-$C_5H_{11}$
Compound No. 336

-continued

Compound No. 335 wherein —R = -n-$C_9H_{19}$
Compound No. 337
Compound No. 335 wherein —R = -n-$C_{11}H_{23}$
Compound No. 338
Compound No. 335 wherein —R = -n-$C_{13}H_{27}$
Compound No. 339
Compound No. 335 wherein —R = -n-$C_{15}H_{31}$ Compound No. 340

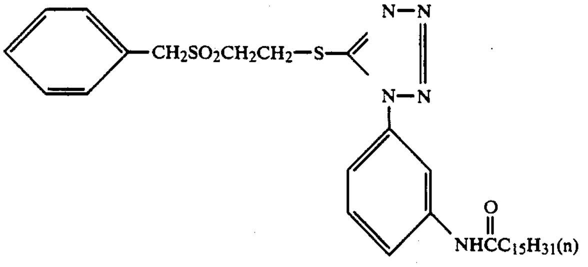

The compounds of formula (III-I) are generally synthesized by Micheal addition reaction of a thiol compound of formula (III-IV) to a vinyl sulfone derivative of formula (III-III) according to the following scheme:

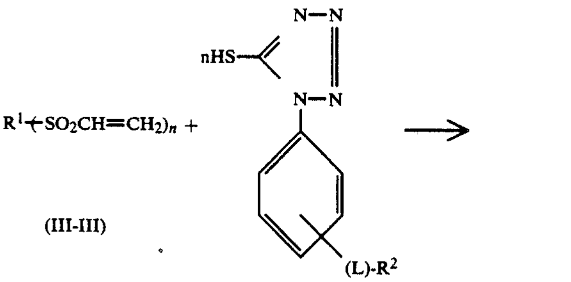

(III-III)

(III-IV)

compound of formula (III-I)

Some examples of synthesis of the present compounds are present below.

Synthesis 31

Synthesis of compound No. 306

A solution of p-chlorophenylvinylsulfonyl (10.1 grams), 1-(m-butyroylaminophenyl)-5-mercaptotetrazole (14 grams), and sodium acetate (4.5 grams) in acetic acid (60 ml) was stirred at 60° C. for 3 hours. The reaction solution was poured into water (200 ml) whereupon crystals precipitated. The resulting crude crystals were filtered off and recrystallized from a solvent mixture of 2/1 ethanol/acetone, yielding compound No. 306. Yield 18.7 grams, 80%, m.p. 167°-170° C.

Synthesis 32

Synthesis of compound No. 311

The procedure of Synthesis 31 was repeated except that the 1-(m-butyroylaminophenyl)-5-mercaptotetrazole was replaced by 1-[m-(2-ethylhexanoylaminophenyl)]-5-mercaptotetrazole (16.25 grams). The resulting crude crystals were recrystallized from a solvent mixture of 5/1 methanol/ethanol, yielding compound No. 311. Yield 15.9 grams, 61%, m.p. 157°-159° C.

Synthesis 33

Synthesis of compound No. 321

The procedure of Synthesis 31 was repeated except that the 1-(m-butyroylaminophenyl)-5-mercaptotetrazole was replaced by 1-[p-(2-methoxyethoxyphenyl)]-5-mercaptotetrazole (13.4 grams). The resulting crude crystals were recrystallized from ethanol, yielding compound No. 321. Yield 16.1 grams, 71%, m.p. 85°-86° C.

The amount of the compound of the present invention used varies with a particular compound and a system to which it is used, although it is generally up to 50% by weight of the total weight of a coating film containing the compound, preferably up to 30% by weight.

The compound of the present invention may be incorporated into a binder as a solution in a water-missible organic solvent or a solvent mixture of such organic solvent and water, examples of the organic solvent including methanol, ethanol, acetone, and dimethylformamide.

The hydrophobic compound of the present invention may be incorporated into a binder by an oil protect technique.

The hydrophobic compound of the present invention may be incorporated into a binder as finely divided particles by the method described in Japanese Patent Application Kokai No. 59-174830. This specification discloses a method for dispersing a base precursor in a binder as finely divided particles, and this method is also useful in dispersing hydrophobic additives including not only the hydrophobic compounds of the present invention, but other hydrophobic (particularly, difficultly soluble in organic solvent) additives, for example, acid precursors and antifogging precursors in a hydrophilic binder to produce a stable dispersion.

This dispersion method is particularly useful in dispersing the compounds of the present invention partly because many of them are difficultly soluble in usual organic solvents and partly because the possible inclusion in a coating film in crystal form substantially improves aging stability as compared with the inclusion as a solution in which the compound is once dissolved.

The compounds of the present invention may be used alone or in admixture of two or more. They may also be combined with another development inhibitor or retarder or another development inhibiting technique. Such compatible development inhibitors and development inhibiting techniques are known, for example, a method based on pyrolysis of aldoxime ester as disclosed in Japanese Patent Application Nos. 58-216928 and 59-48305, a method based on Lossen rearrangement as disclosed in Japanese Patent Application No. 59-85834, and a method using a carboxylate ester as disclosed in Japanese Patent Application No. 59-85836.

The image forming process including a heating step as used herein means that a heating step is involved in any one of image forming steps irrespective of whether the heating is for development or for transfer. Imagewise heating is also contemplated herein.

The heat-developable photosensitive materials used in an image forming process wherein heating is conducted for the purpose of development include such materials using silver halide and materials using diazo compounds. The compounds of the present invention may be added to these photosensitive materials, or when an image-receiving layer is provided on another support, to any desired one of layers on the support. Alternatively, they may be supplied from the outside during heating.

Most preferred heat-developable photosensitive materials are those using silver halide as a photosensitive element.

The heating temperature ranges from about 50° C. to about 250° C., more preferably from about 60° C. to about 180° C.

The silver halides used in the present invention include silver chloride, silver bromide, silver iodide, silver chlorobromide, silver chloroiodide, silver iodobromide, and silver chloroiodobromide, but not limited thereto.

Useful are silver halide emulsions as disclosed in, inter alia, U.S. Pat. No. 4,500,626, col. 50; Research Disclosure, June 1978, pages 9–10 (RD 17029); and Japanese Patent Application Nos. 59-228551, 60-225176, and 60-228267, which are all incorporated herein by reference.

The silver halide emulsions used in the practice of the present invention may be either of the surface latent image type wherein latent images are predominantly formed on the grain surface or of the internal latent image type wherein latent images are formed in the grain interior. Core-shell emulsions are also useful wherein the interior and surface layer of grains are of different phases. Also employable is a direct reversal emulsion having an internal latent image type emulsion combined with a nucleating agent.

The silver halide emulsions may be applied without post-ripening, but ordinarily after chemical sensitization. For chemical sensitization purpose, there may be used sulfur sensitization, reducing sensitization, noble metal sensitization and other processes which are well known in connection with the emulsions for photosensitive materials of the ordinary type, and combinations thereof. Such chemical sensitization may be carried out in the presence of a nitrogen-containing heterocyclic compound as disclosed in Japanese Patent Application Kokai Nos. 58-126526 and 58-215644.

The amount of the photosensitive silver halide coated preferably ranges from 1 mg to 10 g of silver per square meter.

In the practice of the present invention, an organic metal salt may be used as an oxidizing agent in combination with the photosensitive silver halide. It is necessary that the photosensitive silver halide and the organic metal salt be in contact with or close to each other. Preferred organic metal salts are organic silver salts.

The organic compounds which can be used in the preparation of the organic silver salt oxidizing agents include those compounds disclosed in Japanese Patent Application No. 59-228551, pages 37–39 and U.S. Pat. No. 4,500,626. Also useful are silver salts of carboxylic acids having an alkynyl radical such as silver phenylpropiolate as disclosed in Japanese Patent Application No. 60-113235 and silver acetylene as disclosed in Japanese Patent Application No. 60-90089. These organic silver salts may be used alone or in combination of two or more.

These organic silver salts may be used in amounts of from 0.01 to 10 mols, preferably from 0.01 to 1 mol per mol of the photosensitive silver halide. The combined amount of the photosensitive silver halide and the organic silver salt coated suitably ranges from about 50 $mg/m^2$ to 10 $g/m^2$ calculated as silver.

The silver halides used in the practice of the present invention may be spectrally sensitized with methine dyes and other dyes. The dyes useful for spectral sensitization include cyanine dyes, merocyanine dyes, complex cyanine dyes, complex merocyanine dyes, holopolar cyanine dyes, hemicyanine dyes, styryl dyes, and hemioxonol dyes.

Illustrative examples are the sensitizing dyes disclosed in Japanese Patent Application Kokai Nos. 59-80550 and 60-140335 and Research Disclosure, June 1978, pages 12–13 (RD 17029); and the sensitizing dyes of heat-decoloring nature disclosed in Japanese Patent Application Kokai No. 60-111239 and Japanese Patent Application No. 60-72967.

These sensitizing dyes may be used individually or as a combination thereof. A combination of sensitizing dyes is frequently used for supersensitization.

In addition to the sensitizing dye, the emulsion may contain a dye which itself has no spectral sensitization function or a material which does not substantially absorb visible light, but is capable of supersensitization. Such supersensitizing compounds are disclosed in the following U.S. Pat. Nos.:

| U.S. Pat. No. | | |
|---|---|---|
| 2,933,390 | 3,635,721 | 3,635,721 |
| 3,743,510 | 3,615,613 | 3,615,641 |
| 3,617,295 | 3,635,721. | |

These sensitizing dyes may be added to the emulsion during, before or after chemical ripening, or before or after nucleation of silver halide grains according to the teachings of U.S. Patent Nos. 4,183,756 and 4,225,666.

The amount of the sensitizing dye is generally from $10^{-8}$ to $10^{-2}$ mol per mol of the silver halide.

In the practice of the present invention, silver may be used as an image-forming material. Also, there may be contained a compound which, when the photosensitive silver halide or silver ion is reduced into silver at elevated temperatures, produces or releases a mobile or diffusible dye in direct or inverse proportion to the reaction. These compounds are simply referred to as dye-providing substances hereinafter.

Typical of the dye-providing substances which can be used in the present invention are couplers capable of oxidative coupling reaction to form a dye. These couplers may be either four or two equivalent couplers. Also useful are two equivalent couplers having an anti-diffusion group as an eliminatable group and thus forming a diffusible dye through oxidative coupling reaction. Illustrative examples of the developing agents and couplers are described in detail in, for example, T. H.

James, "The Theory of the Photographic Process", 4th Ed., pages 291–334 and 354–361, and the following laid-open specifications.

Japanese Patent Application Kokai Nos:

| Japanese Patent Application Kokai Nos | | |
|---|---|---|
| 58-123533 | 58-149046 | 58-149047 |
| 59-111148 | 59-124399 | 59-174835 |
| 59-231539 | 59-231540 | 60-2950 |
| 60-2951 | 60-14242 | 60-23474 |
| 60-66249. | | |

Another class of dye-providing substances includes compounds having the function of releasing or diffusing a diffusible dye imagewise. The compounds of this type may be represented by the following formula [L,I]:

$$(Dye\text{-}X)_n\text{—}Y \qquad [L\ I]:$$

wherein Dye represents a dye group, a temporarily wavelength shortened dye group or a dye precursor group; X represents a single bond or a connecting group; and Y represents a group which, in correspondence or counter-correspondence to photosensitive silver salt having a latent image distributed imagewise, produces a difference in diffusibility of the compound represented by $(Dye\text{-}X)_n\text{-}Y$ or releases Dye, the diffusibility of Dye released being different from that of the compound represented by $(Dye\text{-}X)_n\text{-}Y$; and n represents an integer of 1 or 2, when n=2, the Dye-X's may be the same or different.

Exemplary of the dye-providing substances having general formula [L I] there may be given dye developing reagents in the form of a hydroquinone-type developing reagent having a dye moiety attached thereto as disclosed in U.S. Pat. Nos. 3,134,764; 3,362,819; 3,597,200; 3,544,545; and 3,482,972. In addition, substances which release a diffusible dye through intramolecular nucleophilic substitution reaction are disclosed in U.S. Pat. No. 3,980,479, and substances which releases a diffusible dye through intramolecular rewind reaction of an isooxazolone ring are disclosed in Japanese Patent Application Kokai No. 49-111628.

Another system is proposed wherein the dye-providing substance is previously modified into an oxidant form having no dye releasing ability so that the modified substance may coexist with a reducing agent or precursor thereof. After development, the reducing agent which remains non-oxidized acts on the modified substance to reduce it, thereby releasing the diffusible dye. Typical examples of the dye-providing substances usable in such a system are described in Japanese Patent Application Kokai Nos. 53-110827, 54-130927, 56-164342, and 53-35533. Dye-providing substances releasing a diffusible dye through a similar mechanism are disclosed in Japanese Patent Application No. 60-244873, which describes compounds which undergo cleavage of their N-O linkage under the action of the remaining reducing agent to release a diffusible dye.

Also useful are non-diffusible (LDA) compounds which undergo donor-acceptor reaction in the presence of a base to release a diffusible dye, but substantially stops the dye release after reaction with an oxidant of a reducing agent as disclosed in Japanese Patent Application Kokai No. 59-185333.

In the systems to which these substances are applied, a diffusible dye is released or diffused where no development has taken place and no dye is released or diffused where development has taken place.

Also known are substances which release a diffusible dye where development has occurred. Couplers having a diffusible dye as an eliminatable group and thus releasing a diffusible dye through reaction with an oxidant of a developing reagent, known as DDR couplers, are described in British Patent No. 1,330,524; Japanese Patent Publication No. 48-39165; U.S. Pat. No. 3,443,940 and the like.

The systems using these reducing agents have the serious problem that the resulting image can be contaminated with oxidation decomposition products of a reducing agent. To overcome this problem, dye-releasing (DRR) compounds have been proposed which themselves have a reducing ability without the need for a reducing agent. They may be advantageously used in the present invention. Typical examples of these compounds are dye-providing substances described in the following publications:

| | | |
|---|---|---|
| U.S. Pat. Nos. | 3,725,062, | 3,728,113, |
| 3,443,939, | 3,928,312, | 4,053,312, |
| 4,055,428, | 4,336,322, | 4,500,626. |
| Japanese Patent Application Kokai Nos. | | |
| 59-65839, | 59-69839, | 58-116537, |
| 57-179840, | 53-3819, | 51-104343 |
| Research Disclosure, RD 17465. | | |

Representative examples of these dye-providing substances are those compounds described in the above-incorporated U.S. Pat. No. 4,500,626, columns 22–44, most preferably the compounds identified therein as compounds (1)–(3), (10)–(13), (16)–(19), (28)–(30), (33)–(35), (38)(40), and (42)–(64).

The dye-providing substances employable other than the aforementioned include dye-silver compounds in which an organic silver salt is combined with a dye (see Research Disclosure, May 1978, pages 54–58), azo dyes useful in heat development silver dye bleaching process (see U.S. Pat. No. 4,235,957; Research Disclosure, April 1976, pages 30–32), and leuco dyes (see U.S. Pat. Nos. 3,985,565 and 4,022,617).

In the practice of the present invention, the dye-providing substances and other hydrophobic additives such as image formation accelerators as will be described later may be introduced into a layer of photosensitive element by any well-known methods, for example, the method described in U.S. Pat. No. 2,322,027. In this case, an organic solvent having a high boiling point as described in Japanese Patent Application Kokai Nos. 59-83154, 59-178451, 59-178452, 59-178453, 59-178454, 59-178455, and 59-178457 may be used, optionally in admixture with an organic solvent having a low boiling point in the range of from 50° C. to 160° C.

The amount of the high boiling organic solvent used in the present invention is up to 10 grams, preferably up to 5 grams per gram of the dye-providing substance.

Further, it is possible to use a method for dispersion in polymers as described in Japanese Patent Publication No. 51-39853 and Japanese Patent Application Kokai No. 51-59943.

In case the substance is substantially insoluble in water, it may be finely divided into particles before being incorporated in the binder although the aforementioned methods may also be applicable.

Moreover, various surface-active agents may be used when a hydrophobic substance like the dye-providing substance is dispersed in a hydrophilic colloid. For this purpose, the surface-active agents illustrated in Japanese Patent Application Kokai No. 59-157636, incorporated herein by reference, pages 37-38 may be used.

A reducing agent may desirably be used in the photosensitive element in the practice of the present invention. The reducing agents used herein include well-known reducing agents and the above-mentioned dye-providing substances having reducing ability. Also included are reducing agent precursors which themselves have no reducing nature, but exhibit reducing nature under the action of a nucleophilic agent or heat during the development process.

Examples of the reducing agents used herein include those reducing agents described in U.S. Pat. No. 4,500,626, columns 49-50, U.S. Pat. No. 4,483,914, columns 30-31, Japanese Patent Application Kokai No. 60-140335, pages 17-18, and Japanese Patent Application Kokai Nos. 60-128438, 60128436, 60-128439, and 60-128437. Also useful are reducing agent precursors as disclosed in Japanese Patent Application Kokai Nos. 56-138736 and 57-40245, U.S. Pat. No. 4,330,617, and the like. Various combinations of reducing agents as described in U.S. Pat. No. 3,039,869 may also be used.

In the practice of the present invention, the reducing agent may be added in amounts of from 0.01 to 20 mols, preferably from 0.1 to 10 mols per mol of silver.

Further, in the present invention, it is possible to use a compound which activates development simultaneously with stabilizing the image. Particularly preferred compounds used herein are those described in U.S. Pat. No. 4,500,626.

A variety of anti-fogging agents may be used in the practice of the present invention. Preferred anti-fogging agents are azoles and azaindenes as disclosed in Research Disclosure, December 1978, pages 24-25, nitrogen-containing carboxylic acids and phosphoric acids as described in Japanese Patent Application Kokai No. 59-168442, mercapto compounds and metals salts thereof as described in Japanese Patent Application Kokai No. 59-111636, and acetylene compounds as described in Japanese Patent Application No. 60-228267.

The photosensitive element used in the practice of the present invention may contain a toning agent if desired. Useful toning agents are those described in Japanese Patent Application No. 59-268926, pages 92-93.

In order to provide a wide range of color within the chromaticity diagram using the three primary colors, yellow., magenta and cyan, the photosensitive elements used in the present invention should include at least three silver halide emulsion layers having sensitivity in different spectra. Combinations of three layers, typically blue-, green-, and red-sensitive layers, and green-, red-, and infraredsensitive layers are contemplated herein. Each of these photosensitive layers may be divided into two or more sublayers, if desired.

The photosensitive elements used in the practice of the present invention may further contain any of various additives well known for use in heat-developable photosensitive elements and possess in addition to the photosensitive layers, any layers including a protective layer, intermediate layer, antistatic layer, antihalation layer, release layer for facilitating separation from a dye-fixing element, and matte agent layer.

Exemplary of the additives there may be given plasticizers, matte agents, sharpness improving dyes, antihalation dyes, surface-active agents, brighteners, antisliding agents, antioxidants, anti-discoloration agents, etc. as described in Research Disclosure, June 1978, pages 9-15, and Japanese Patent Application No. 59-209563. More specifically, the protective layer or coat (PC) usually contains an organic or inorganic matte agent for adherence prevention. The protective layer may futher contain a mordant, a UV-absorber, etc. Each of the protective and intermediate layers may be comprised of two or more layers.

The intermediate layer may contain a reducing agent for preventing discoloration or color mixing, a UV absorber, and a white pigment such as titanium dioxide. The white pigment may be added not only to the intermediate layer, but also to the emulsion layers for the purpose of increasing sensitivity.

The photographic element according to the present invention may be comprised of a photosensitive element which forms or releases a dye through heat development and optionally, a dye-fixing element which fixes the dye.

Particularly, systems of forming an image through diffusion transfer of a dye need the photosensitive and dye-fixing elements as requisite elements. They are generally classified into two typical forms, one form having photosensitive and dye-fixing layers separately applied on two separate supports and another form having both photosensitive and dye-fixing layers applied on a common support. With respect to the relation of the photosensitive element and the dye-fixing element to one another, to the support, and to a white reflective layer, reference may be made to the descriptions of Japanese Patent Application No. 59-268926, pages 58-59 and U.S. Pat. No. 4,500,626, col. 57.

The dye-fixing element preferably used in the present invention has at least one layer containing a mordant and a binder. The mordants may be those well known in the photographic art, with illustrative examples being described in Japanese Patent Application No. 59-209563. The dye-fixing element may be provided with any auxiliary layers, for example, a protective layer, anti-curling layer, and release layer, if desired. The provision of a protective layer is particularly useful. One or more of these layers may contain a hydrophilic thermal solvent, plasticizer, anti-discoloration agent, UV-absorber, anti-sliding agent, matte agent, antioxidant, dispersed vinyl compound for increasing dimensional stability, surface-active agent, brightener, etc. In a system wherein heat development and dye transfer are simultaneously conducted in the presence of a minor amount of water, it is preferable from the standpoint of enhanced shelf stability of photosensitive element to contain a base and/or base precursor (as will be described later) in the dye-fixing element. Illustrative examples of these additives are described in Japanese Patent Application No. 59-209563, pages 101-120.

An image formation promotor may also be used in the photosensitive element and/or dye-fixing element in the practice of the present invention. The image formation promotors have the functions of promoting such reaction as redox reaction of a silver salt-oxidizing agent with a reducing agent, formation of a dye from a dye-providing substance, decomposition of a dye or release of a mobile dye, and promoting transfer of a dye from a photosensitive material layer to a dye-fixing layer. From their physical-chemistry, they may be classified into bases, base precursors, nucleophilic compounds, high-boiling organic solvents (oils), thermal solvents, surface-active agents, and compounds capable of interacting with silver or silver ion. It should be noted that these compounds generally have multiple functions and thus possess some of the abovementioned promoting effects combined. For further detail, reference is to be made to Japanese Patent Application No. 59-213978, pages 67-71.

A number of other base producing methods are known and any of the compounds used in these methods are useful as the base precursor. For example, Japanese Patent Application No. 60-169585 discloses a method for producing a base by mixing a difficultly soluble metal compound with a compound (complexing compound) capable of forming a complex with the metal ion of the metal compound, and Japanese Patent Application No. 60-74702 discloses electrolytic base generation.

The former method is particularly effective. Examples of the difficultly soluble metal compounds include carbonates, hydroxides, and oxides of zinc, aluminum, calcium, and barium. The complexing compounds are detailed in, for example, A. E. Martell and R. M. Smith, "Critical Stability Constants", Vol. 4 and 5, Plenum Press. Some illustrative examples of the complexing compounds include salts of aminocarboxylic acids, imidinoacetic acids, pyridylcarboxylic acids, aminophosphoric acids, carboxylic acids (including mono-, di-, tri-, and tetracarboxylic acids with or without such a substituent as phosphono, hydroxy, oxo, ester, amide, alkoxy, mercapto, alkylthio, phosphino, etc.), hydroxamic acids, polyacrylic acids, and polyphosphoric acids with alkali metals, guanidines, amidines, and quaternary ammonium. It is advantageous to separately add the difficultly soluble metal compound and the complexing compound to the photosensitive element and the dye-fixing element, respectively, or vice verse.

In the practice of the present invention, a variety of development inhibitors may be used in the photosensitive element and/or dye-fixing element for the purpose of obtaining a consistent image irrespective of variations in treating temperature and time during heat development. By the development inhibitor is meant those compounds capable of, immediately after development has proceeded to an optimum extent, neutralizing or reacting with a base to reduce its concentration in the film to inhibit development, or those compounds capable of, immediately after optimum development, interacting with silver or silver salt to retard development. Illustrative examples are acid precursors capable of releasing acid upon heating, electrophilic compounds capable of substitution reaction with a coexisting base upon heating, nitrogen-containing heterocyclic compounds, mercapto compounds and their precursors, and the like. Specific examples are disclosed in Japanese Patent Application Nos. 58-216928, 59-48305, 59-85834, and 59-85836.

Also useful are those compounds which release mercapto compounds upon heating, for example, those described in the following Japanese Patent Applications.

| | | |
|---|---|---|
| 59-190173 | 59-268926 | 59-246468 |
| 60-26038 | 60-22602 | 60-26039 |
| 60-24665 | 60-29892 | 59-176350 |

A hydrophilic binder may be employed in the photosensitive element and/or dye-fixing element in the practice of the present invention. The typical hydrophilic binder is a transparent or translucent hydrophilic binder, examples of which include natural substances, for example, proteins such as gelatin, gelatin derivatives and cellulose derivatives and polysaccharides such as starch, gum arabic, etc.; and synthetic polymers, for example, water-soluble polyvinyl compounds such as polyvinyl pyrrolidone, acrylamide polymer, etc. Another example of the synthetic polymer compound is a dispersed vinyl compound in a latex form which is used for the purpose of increasing the dimensional stability of a photographic material. These binders may be used alone or in admixture.

The binders may be coated in amounts of up to 20 grams per square meter, preferably up to 10 grams per square meter, and most preferably up to 7 grams per square meter.

The high-boiling organic solvent may be dispersed in the binder together with hydrophobic compounds, for example, a dye-providing substance such that the volume of the solvent is less than about 1 cc, preferably less than about 0.5 cc, and most preferably less than about 0.3 cc per gram of the binder.

Any of the layers of the heat-developable photosensitive element and the dye-fixing element according to the present invention, including photographic emulsion, dye-fixing and other layers, may contain inorganic or organic hardeners Illustrative examples of the hardeners are those set forth in Japanese Patent Application No. 59-268926, pages 94–95, and Japanese Patent Application Kokai No. 59-157636, page 38. They may be used alone or in combination.

To promote dye transfer, the photosensitive element or dye-fixing element may contain a hydrophilic thermal solvent which is solid at an ambient temperature, but melts at elevated temperatures to serve as solvents.

The hydrophilic thermal solvent may be incorporated in the photosensitive element and/or the dye-fixing element. Although the solvent can be incorporated into any of the emulsion layer, intermediate layer, protective layer, and dye-fixing layer, it is preferred to incorporate it into the dye-fixing layer and/or layers adjacent thereto. Examples of the hydrophilic thermal solvents include ureas, pyridines, amides, sulfonamides, imides, alcohols, oximes and other heterocyclic compounds. A high-boiling organic solvent may be contained in the photosensitive element and/or the dyefixing element for the purpose of promoting dye transfer.

The support suitable for use in the photosensitive element and/or dye-fixing element according to the present invention must withstand the processing temperature. Exemplary of ordinary supports there may be given not only glass, paper, polymer film, metal and analogues, but also those described as supports in Japanese Patent Application No. 59-268926, pages 95–96.

The photosensitive element and/or dye-fixing element according to the present invention may have an electroconductive heating element layer serving as heating means for heat development or diffusion transfer of dye. Such a transparent or opaque heating element may be provided in the form of a resistance heating element using a conventional well-known technique. The resistance heating element may be prepared by utilizing a thin film of a semiconductive inorganic material or an organic thin film of conductive fine particles dispersed in a binder. The materials which can be used in these methods are described in Japanese Patent Application No. 59-151815.

In the practice of the present invention, the heat-developable photosensitive, protective, intermediate, undercoat, backcoat, dye-fixing, and other layers may be applied by any conventional coating methods, typically, the method described in U.S. Pat. No. 4,500,626.

The light source for image exposure to record an image in the heat-developable light-sensitive element may be any radiation including visible light. In general, light sources used in ordinary color printing may be used, for example, tungsten lamps, mercury lamps, halogen lamps like iodine lamps, xenon lamps, laser sources, CRT sources, fluorescent lamps, light emitting diodes (LED), and the like as set forth in Japanese Patent Application No. 59-268926, page 100 and U.S. Pat. No. 4,500,626, col. 56.

In the practice of the present invention, a heat development step and a dye transfer step may be carried out independently or concurrently. A continuous step is also contemplated herein in that development is immediately followed by dye transfer within the single step.

Representative processes are processes comprising (1) imagewise exposing a photosensitive element, heating the element, placing a dye-providing element thereon, and causing a mobile dye to transfer to the dye-providing element optionally by heating, and (2) imagewise exposing a photosensitive element, placing a dye-providing element thereon, and heating the assembly to transfer a mobile dye to to the dye-providing element. These processes (1) and (2) may be carried out in the substantial absence of water or in the presence of a minor amount of water.

The heating temperature used in the heat development step generally ranges from about 50° C. to about 250° C., preferably from about 80° C. to about 180° C. The upper limit of heating temperature is the boiling point of water when heating is effected in the presence of a minor amount of water. Where a dye transfer step is carried out after completion of a heat development step, the heating temperature used in the transfer step may range from room temperature to the temperature used in the heat development to enable dye transfer, more preferably from 50° C. to a temperature which is about 10° C. lower than the temperature used in the heat development.

In one preferred mode of the image forming process of the present invention, a heat-developable photosensitive material is heated to conduct development in the presence of a minor amount of water and a base and/or base precursor after or simultaneous with imagewise exposure, thereby transferring to the dye-fixing layer a diffusible dye which is produced in areas corresponding or counter-corresponding to silver images at the same time as development. This mode produces a high density color image within a short time because the reaction of producing or releasing the diffusible dye proceeds very quickly and hence, the migration of the diffusible dye to the dye-fixing layer takes place quickly.

The amount of water used in this image forming mode is as small as at least 1/10 of the weight of the overall coating of the photosensitive and dye-fixing elements, and preferably ranges from 1/10 of the weight of the overall coatings of the photosensitive and dye-fixing elements up to the weight of solvent corresponding to the maximum swollen volume of the overall coatings, more specifically up to the weight of solvent corresponding to the maximum swollen volume of the overall coatings minus the weight of the overall coatings.

Swollen coating films are unstable, and even susceptible to local oozing under certain conditions. To avoid such inconvenience, the amount of water should preferably be up to the weight of water corresponding to the maximum swollen volume of the overall coatings of the photosensitive and dye-fixing elements. More particularly, the amount of water ranges from 1 gram to 50 grams, more preferably from 2 grams to 35 grams, and most preferably from 3 grams to 25 grams per square meter of the combined surface area of the photosensitive and dye-fixing elements.

The base and/or base precursor used in the above-described mode may be incorporated in either the photosensitive element or the dye-fixing element. It may also be supplied as its solution in water.

Preferably in the above-described mode, a basic metal compound difficultly soluble in water and a compound (complexing compound) capable of water-mediated complexing reaction with the metal ion of the metal compound in the presence of water medium may be contained as base precursors in an image forming reaction system so that these two compounds react with each other to increase the pH of the system at the time of heating.

The term image forming reaction system used herein designates a region where image forming reaction takes place. Specifically contemplated is a layer belonging to both the photosensitive element and the dye-fixing element. When more than one such layer is present, either of them may be assigned.

The difficultly soluble metal compound and the complexing compound should be at least added to separate layers in order to prevent them from reacting until development treatment commences. For instance, in a so-called mono-sheet material wherein the photosensitive element and the dye-fixing element are on a common support, these two compounds may be added to separate layers between which at least one layer preferably intervenes. In a more preferred embodiment, the difficultly soluble metal compound and the complexing compound are separately contained in layers formed on separate supports. For example, the difficultly soluble metal compound may preferably be contained in a photosensitive element having one support and the complexing compound contained in a dye-fixing element having another support. The complexing compound may be provided in the form of a solution in water to be supplied. The difficultly soluble metal compound is desirably contained as a fine particulate dispersion prepared, for example, by the methods described in Japanese Patent Application Kokai Nos. 56-174830 and 53-102733, wherein it preferably has an average particle size of up to 50 μm, more preferably up to 5 μm. The difficultly soluble metal compound may be added to any one or more of the layers of the photosensitive element including photosensitive, intermediate, and protective layers.

The amount of the difficultly soluble metal compound and the complexing compound contained in layers on a support or supports depends on a particular type of compound used, the particle size of the difficultly soluble metal compound, complexing reaction rate, and other factors. Each of them is preferably contained in an amount of up to 50% by weight of the weight of the associated coating layer, more preferably from 0.01 to 40% by weight. Where the complexing compound is provided in the form of a solution in water, the solution preferably contains 0.005 to 5 mols, especially 0.05 to 2 mols of the complexing compound per liter of water. The content of the complexing compound in the reaction system according to the present invention is preferably 1/100 to 100 times, more preferably 1/10 to 20 times that of the difficultly soluble metal compound.

A suitable method for providing water to the photosensitive or dye-fixing layer is the method described in Japanese Patent Application No. 59-268926, pages 101–102, for example.

Heating means used during the development or transfer step in the practice of the present invention may be any of the means described in Japanese Patent Application No. 59-268926, pages 102–103, including heat blocks, irons, and heat rollers. It is also possible to provide the photosensitive and/or dye-fixing element with a layer of electroconductive material such as graphite, carbon black, and metal whereby electric current is conducted to the conductive layer to directly heat the associated elements.

The pressure under which the photosensitive and dye-fixing layers are in firm contact and application of such pressure may be in accord with the method described in Japanese Patent Application No. 59-268926, pages 103–104.

In the treatment of a photographic element according to the present invention, any of various well-known heat-development equipment may be used. Useful equipment are described in, for example, Japanese Patent Application Kokai Nos. 59-75247, 59-177547, 59-181353, and 60-18951, and Japanese Utility Model Application No. 60-116734.

In the image forming process including heating step according to the present invention, there are contemplated two representative embodiments, one embodiment wherein heat development is conducted in the presence of water and a base and/or base precursor and another embodiment wherein heat development is conducted in the substantial absence of water. Although both of them perform well, the former embodiment is more desirable for some reasons. The presence of water is more advantageous to facilitate the reaction. The 1-phenyltetrazole ring contained in useful representative compounds among the compounds of general formula (I) is generally sensitive to heat, and the former embodiment can employ a lower treating temperature.

In the more preferred former embodiment, either of the following two methods may preferably be employed, a first method of incorporating a base or analogue in the dye-fixing element and a second method of separately adding the difficultly soluble metal compound and the complexing compound to the photosensitive element and the dye-fixing element, respectively. The compound of general formula (I) may preferably be added to the photosensitive element in the first method, and either the photosensitive element or the dye-fixing element in the second method.

The development retarder released from the compound of general formula (I) should preferably have appropriate diffusibility when the compound is added to the dye-fixing element, but contrarily, should preferably have poor diffusibility when the compound is added to the photosensitive element. More illustratively, as previously described, the most preferred development retarders are

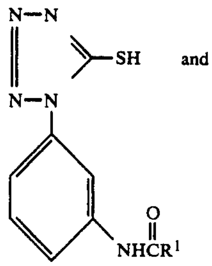

and

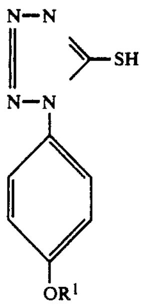

wherein $R^1$ preferably contains up to 9 carbon atoms when the precursor compound is added to the dye-fixing element, and at least 5 carbon atoms, especially at least 10 carbon atoms when the precursor compound is added to the photosensitive element. The most useful embodiment prefers the use of the second method and the addition of a precursor of a poorly difffusible development retarder to the photosensitive layer although substantially equivalent effect is accomplished in other embodiments.

Since a heat-developable photosensitive material is heated in the presence of a compound of general formula (I) in the image forming process including heating step according to the present invention, the development process terminates at an optimum degree of development to avoid fogging due to over-development and minimize photographic performance variation due to varying heating temperature.

EXAMPLES

In order that those skilled in the art may better understand how the present invention may be practiced, the following examples are given by way of illustration and not by way of limitation.

EXAMPLE 1

Preparation of Silver Benzotriazole Emulsion

A silver benzotriazole emulsion was prepared as follows. Twenty eight (28) grams of gelatin and 13.2 grams of benzotriazole were dissolved in 300 ml of water. The resulting solution was agitated at 40° C. A solution of 17 grams silver nitrate in 100 ml water was added to the solution over a period of 2 minutes.

The resulting silver benzotriazole emulsion was adjusted to such pH that an excess salt precipitated, and the excess salt was filtered off. The emulsion was then adjusted to pH 6.30, obtaining a silver benzotriazole emulsion in a yield of 400 grams.

Preparation of Silver Halide Emulsion

A silver halide emulsion used in first and fifth layers was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.40 μm (bromine 50 mol %).

After rinsing with water and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

A silver halide emulsion used in a third layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.35 μm (bromine 80 mol%).

After water rinsing and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

Next, a dispersion of a dye-providing substance in gelatin was prepared as follows.

Preparation of Gelatin Dispersion of Dye-Providing Substance

Five (5) grams of yellow dye-providing substance (A) having the formula shown below was dissolved together with 0.5 grams of succinic acid-2-ethylhexyl ester sodium sulfonate and 10 grams of triisononyl phosphate in 30 ml of ethyl acetate by heating at about 60° C., obtaining a homogeneous solution. The solution was mixed with 100 grams of a 10 wt% lime-treated gelatin solution by agitation, and the mixture was dispersed with a homogenizer for 10 minutes at 10,000 rpm. This dispersion is called yellow dye-providing substance dispersion.

A magenta dye-providing substance dispersion was prepared by the same procedure as above except that a magenta dye-providing substance (B) was used as the dye-providing substance and 7.5 grams of tricresyl phosphate was used as the high boiling solvent.

A cyan dye-providing substance dispersion was prepared by the same procedure as above except that a cyan dye-providing substance (C) was used as the dye-providing substance.

A gelatin dispersion of compound No. 129 of the present invention was prepared as follows.

To 100 grams of an aqueous solution of 1% gelatin were added 5 grams of compound No. 129 and 0.5 grams of a surface-active agent of the following formula:

$$\begin{array}{l} \quad\quad\;\; CH_2COOCH_2CH(C_2H_5)C_4H_9 \\ \quad\quad\;\; | \\ NaO_3S{-}CHCOOCH_2CH(C_2H_5)C_4H_9. \end{array}$$

The mixture was ground for 10 minutes in a ball mill filled with 100 grams of glass beads having an average diameter of about 0.6 mm. Filtration of the glass beads resulted in a gelatin dispersion of compound No. 129.

Using these preparations, there was prepared a color light-sensitive material No. 101 of multi-layer structure as shown in the following formulation:

FORMULATION OF PHOTOSENSITIVE MATERIAL NO. 101

Sixth layer
gelatin (coating weight 1000 mg/m$^2$)
hardener*3 (coating weight 20 mg/m$^2$)
silica*5 (coating weight 100 mg/m$^2$)
Fifth layer: Green-sensitive emulsion layer
silver chlorobromide emulsion (bromine 50 mol%, coating weight 400 mg/m$^2$ of Ag)
sulfamide compound*6 (coating weight 180 mg/m$^2$)
silver benzotriazole emulsion (coating weight 100 mg/m$^2$ of Ag)
sensitizing dye D-1 (coating weight $10^{-6}$ mol/m$^2$)
compound No. 129 (coating weight 12 mg/m$^2$)
hardener*3 (coating weight 20 mg/m$^2$)
yellow dye-providing substance (A) (coating weight 500 mg/m$^2$)
gelatin (coating weight 1000 mg/m$^2$)
high-boiling solvent*4 (coating weight 800 mg/m$^2$)
surface-active agent*2 (coating weight 100 mg/m$^2$)
Fourth layer: Intermediate layer
gelatin (coating weight 800 mg/m$^2$)
hardener*3 (coating weight 16 mg/m$^2$)
Third layer: Red-sensitive emulsion layer
silver chlorobromide emulsion (bromine 80 mol%, coating weight 300 mg/m$^2$ of Ag)
sulfamide compound*6 (coating weight 180 mg/m$^2$)
silver benzotriazole emulsion (coating weight 100 mg/m$^2$ of Ag)
sensitizing dye D-2 (coating weight $8 \times 10^{-7}$ mol/m$^2$)
compound No. 129 (coating weight 12 mg/m$^2$)
hardener*3 (coating weight 20 mg/m$^2$)
magenta dye-providing substance (B) (coating weight 320 mg/m$^2$)
gelatin (coating weight 1000 mg/m$^2$)
high-boiling solvent*1 (coating weight 600 mg/m$^2$)
surface-active agent*2 (coating weight 100 mg/m$^2$)
Second layer: Intermediate layer
gelatin (coating weight 800 mg/m$^2$)
hardener*3 (coating weight 16 mg/m$^2$)
First layer: Infrared-sensitive emulsion layer
silver chlorobromide emulsion (bromine 50 mol%, coating weight 300 mg/m$^2$ of Ag)
sulfamide compound*6 (coating weight 180 mg/m$^2$)
silver benzotriazole emulsion (coating weight 100 mg/m$^2$ of Ag)
sensitizing dye D-3 (coating weight $10^{-8}$ mol/m$^2$)
compound No. 129 (coating weight 12 mg/m$^2$)
hardener*3 (coating weight 16 mg/m$^2$)
cyan dye-providing substance (C) (coating weight 320 mg/m$^2$)
gelatin (coating weight 1000 mg/m$^2$)
high-boiling solvent*4 (coating weight 600 mg/m$^2$)
surface-active agent*2 (coating weight 100 mg/m$^2$)
Support (polyethylene terephthalate 100 μm thick)

*1 tricresyl phosphate

-continued
*2 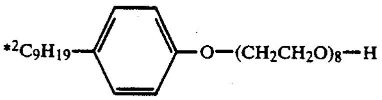
*3 $CH_2{=}CHSO_2CH_2CONHCH_2CH_2NHCOCH_2SO_2CH{=}CH_2$
*4 $(iso\text{-}C_9H_{19}O)_3P{=}O$
*5 size 4 μm
*6 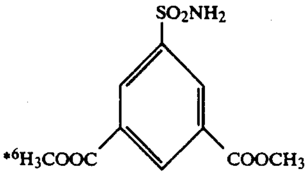
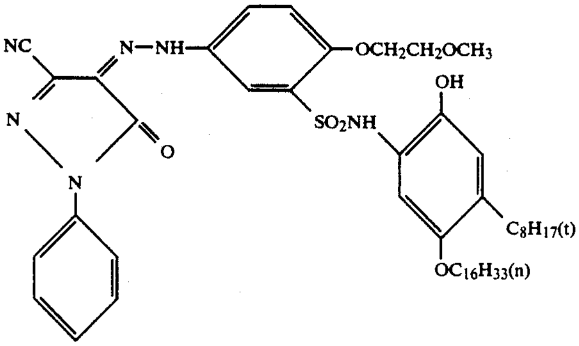
(A)
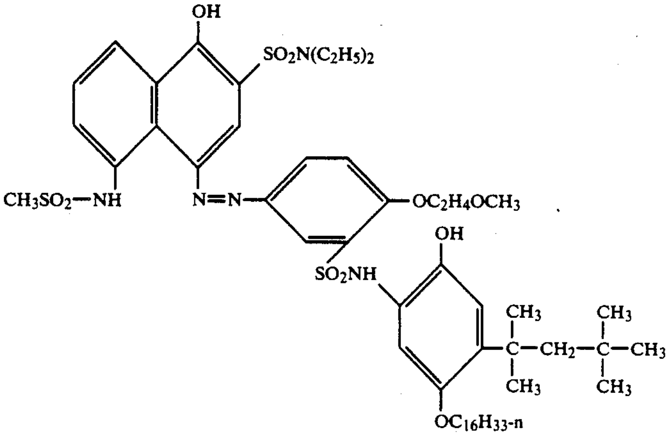
(B)

-continued

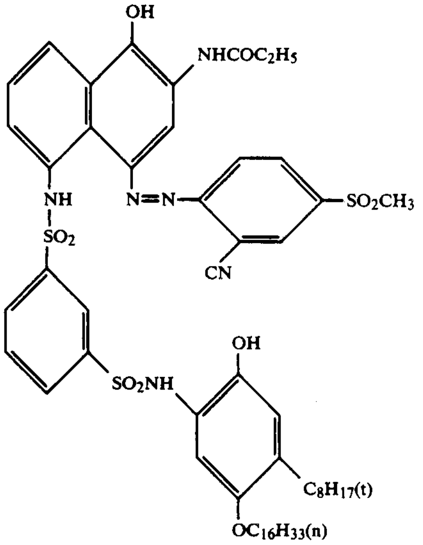

(C)

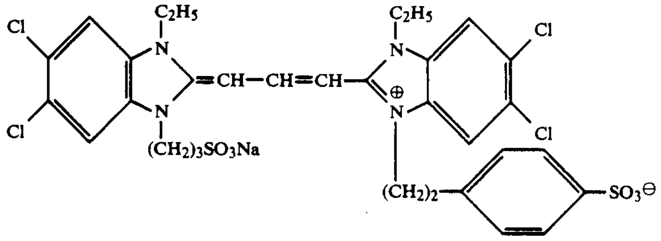

(D-1)

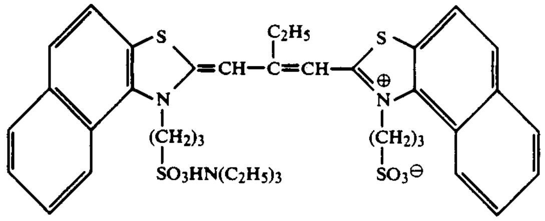

(D-2)

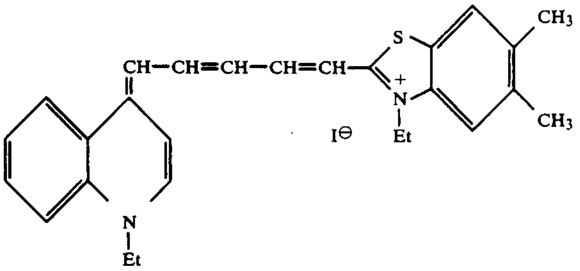

(D-3)

Photosensitive material Nos. 102 and 103 were prepared by following the same procedure as photosensitive material No. 101 except that compound No. 129 was replaced by compound Nos. 117 and 116 according to the present invention. For comparison purpose, photosensitive material No. 104 was prepared by following the same procedure as photosensitive material No. 101 except that the compound of the present invention was omitted.

Next, the preparation of a dye-fixing material will be described.

Preparation of Dye-Fixing Material

In 200 ml of water was dissolved 15 grams of a polymer having the structure as defined below. The solution was homogeneously mixed with 100 grams of 10 wt% lime-treated gelatin and 7 grams of guanidine carbonate. The resulting mixture was uniformly spread onto a paper substrate laminated with polyethylene having titanium dioxide dispersed therein, thereby forming a dye-fixing layer having a uniform wet thickness of 85 μm, which was then dried.

Separately, 0.75 grams of gelatin hardener H-1, 0.25 grams of gelatin hardener H-2, 160 ml of water, and 100 grams of 10% lime-treated gelatin were evenly mixed. The mixture was uniformly coated on the dye-fixing layer to a wet film thickness of 60 μm. After drying, there was obtained a dye-fixing material.

Polymer structure:

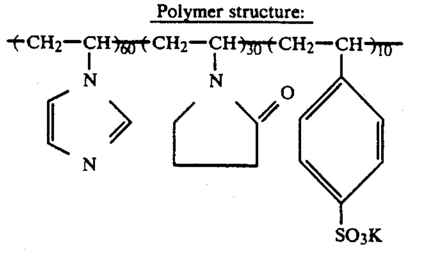

(intrinsic viscosity 0.3473 as measured in 1/20 M $Na_2HPO_4$ aqueous solution at 30° C.)

Gelatin hardener H-1:

$CH_2=CHSO_2CH_2CONHCH_2CH_2NHCOCH_2SO_2CH=CH_2$

Gelatin hardener H-2:

$CH_2=CHSO_2CH_2CONHCH_2CH_2CH_2NHCOCH_2SO_2CH=CH_2$

Multilayered color light-sensitive material Nos. 101–104 were exposed for one second at 500 lux under a tungsten lamp through three color separation filters G, R, and IR having a continuously varying density. It should be noted that filter G is a 500–600 nm band pass filter, filter R is a 600–700 nm band pass filter, and filter IR is a filter transmitting light having wavelengths of at least 700 nm.

Water was applied by means of a wire bar in an amount of 20 ml per square meter to the emulsion surface of the thus exposed light-sensitive material, which was superimposed on the dye-fixing material such that their effective surfaces faced one another. After heating for 20 seconds through heat rollers at such a temperature such that the temperature of the wet film reached 93° or 98° C., the dye-fixing material was peeled from the light-sensitive material. The dye-fixing material then bore thereon clear images of yellow (Y), magenta (M), and cyan (C) corresponding to the three color separation filters. The maximum density (Dmax) and minimum density (Dmin) of the respective color images were measured by means of a Macbeth (RD-519) reflection densitometer. The results are shown in Table 1.

TABLE 1

| Photo-sensitive material | Compound of invention | | Heating at 93° C. for 20 sec. | | Heating at 98° C. for 20 sec. | |
|---|---|---|---|---|---|---|
| | | | Dmax | Dmin | Dmax | Dmin |
| 101 | 129 | Yellow | 1.86 | 0.11 | 1.91 | 0.13 |
| | | Magenta | 2.03 | 0.13 | 2.08 | 0.15 |
| | | Cyan | 2.14 | 0.12 | 2.17 | 0.16 |
| 102 | 117 | Yellow | 1.83 | 0.12 | 1.88 | 0.18 |
| | | Magenta | 2.02 | 0.12 | 2.06 | 0.17 |
| | | Cyan | 2.12 | 0.11 | 2.14 | 0.14 |
| 103 | 116 | Yellow | 1.88 | 0.14 | 1.92 | 0.18 |
| | | Magenta | 2.04 | 0.13 | 2.10 | 0.20 |
| | | Cyan | 2.17 | 0.13 | 2.20 | 0.19 |
| 104 (control) | — | Yellow | 1.84 | 0.12 | 1.96 | 0.40 |
| | | Magenta | 2.02 | 0.14 | 2.18 | 0.35 |
| | | Cyan | 2.15 | 0.12 | 2.21 | 0.28 |

As evident from the data in Table 1, the photosensitive materials containing the compounds of the present invention experience a smaller increase of Dmax and Dmin when the developing temperature is raised by 5 degrees whereas the control material free of the compound of the present invention produces markedly increased fog. It is thus evident that the compounds of the present invention have great temperature compensation effect.

EXAMPLE 2

A gelatin dispersion of basic zinc carbonate was prepared.

Combined with 4% aqueous gelatin solution were 12.5 grams of basic zinc carbonate and 2 grams of a surface-active agent of the formula:

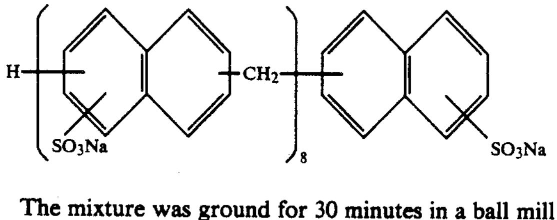

The mixture was ground for 30 minutes in a ball mill filled with glass beads having an average diameter of 0.75 mm. Filtration of the glass beads resulted in a gelatin dispersion of basic zinc carbonate.

Using this dispersion as well as the emulsions, dye-providing substances, and additives described in Example 1, photosensitive material No. 121 was prepared as formulated below.

FORMULATION OF PHOTOSENSITIVE MATERIAL NO. 121

Sixth layer
gelatin (coating weight 1000 mg/m$^2$)
hardener*3 (coating weight 20 mg/m$^2$)
silica*5 (coating weight 100 mg/m$^2$)
basic zinc carbonate (coating weight 800 mg/m$^2$)
Fifth layer: Green-sensitive emulsion layer
silver chlorobromide emulsion (bromine 50 mol%, coating weight 400 mg/m$^2$ of Ag)
sulfamide compound*6 (coating weight 180 mg/m$^2$)
silver benzotriazole emulsion (coating weight 100 mg/m$^2$ of Ag)
sensitizing dye D-1 (coating weight $10^{-6}$ mol/m$^2$)
hardener*3 (coating weight 20 mg/m$^2$)
yellow dye-providing substance (A) (coating weight 500 mg/m$^2$)
gelatin (coating weight 1000 mg/m$^2$)
high-boiling solvent*4 (coating weight 800 mg/m$^2$)
surface-active agent*2 (coating weight 100 mg/m$^2$)
Fourth layer: Intermediate layer
gelatin (coating weight 800 mg/m$^2$)
hardener*3 (coating weight 16 mg/m$^2$)
Third layer: Red-sensitive emulsion layer
silver chlorobromide emulsion (bromine 80 mol%, coating weight 300 mg/m$^2$ of Ag)
sulfamide compound*6 (coating weight 180 mg/m$^2$)
silver benzotriazole emulsion (coating weight 100 mg/m$^2$ of Ag)
sensitizing dye D-2 (coating weight $8\times10^{-7}$ mol/m$^2$)
hardener*3 (coating weight 20 mg/m$^2$)
magenta dye-providing substance (B) (coating weight 320 mg/m$^2$)
gelatin (coating weight 1000 mg/m$^2$)
high-boiling solvent*1 (coating weight 600 mg/m$^2$)
surface-active agent*2 (coating weight 100 mg/m$^2$)
Second layer: Intermediate layer
gelatin (coating weight 800 mg/m$^2$)

hardener*3 (coating weight 16 mg/$m^2$)

First layer: Infrared-sensitive emulsion layer silver chlorobromide emulsion (bromine 50 mol%, coating weight 300 mg/$m^2$ of Ag)

sulfamide compound*6 (coating weight 180 mg/$m^2$)

silver benzotriazole emulsion (coating weight 100 mg/$m^2$ of Ag)

sensitizing dye D-3 (coating weight $10^{-8}$ mol/$m^2$)

hardener*3 (coating weight 16 mg/$m^2$)

cyan dye-providing substance (C) (coating weight 320 mg/$m^2$)

gelatin (coating weight 1000 mg/$m^2$)

high-boiling solvent*4 (coating weight 600 mg/$m^2$)

surface-active agent*2 (coating weight 100 mg/$m^2$)

Support (polyethylene terephthalate 100 μm thick)

Note: The asterisked substances (*1-6) and other substances are the same as in Formulation of Example 1.

A dye-fixing material having an image-receiving layer was prepared.

First, 15 grams of the polymer used in preparing the dye-fixing material of Example 1 was dissolved in 200 ml of water and then combined with 100 grams of 10% lime-treated gelatin, 8 grams of compound (a) of the following formula, and 3 grams of a gelatin dispersion of compound No. 105 of the present invention dispersed by the same method as in Example 1.

Structure of compound (a):

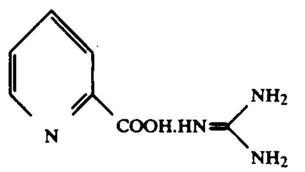

The mixture was evenly spread on a paper substrate laminated with polyethylene having titanium dioxide dispersed therein, thereby forming a dye-fixing layer having a uniform wet thickness of 85 μm, which was then dried.

Separately, 0.75 grams of gelatin hardener H-1, 0.25 grams of gelatin hardener H-2, 160 ml of water, and 100 grams of 10% lime-treated gelatin were evenly mixed. The mixture was uniformly coated on the dye-fixing layer to a wet film thickness of 60 μm. After drying, there was obtained a dye-fixing material.

Using photosensitive material No. 121 and the above prepared dye-fixing material, the procedure of Example 1 was followed. The results are shown below.

TABLE 2

| | Photosensitive material No. 121 | | | |
|---|---|---|---|---|
| | Heating at 93° C. for 20 sec. | | Heating at 98° C. for 20 sec. | |
| | Dmax | Dmin | Dmax | Dmin |
| Yellow | 1.95 | 0.12 | 2.01 | 0.16 |
| Magenta | 2.04 | 0.14 | 2.09 | 0.19 |
| Cyan | 2.18 | 0.11 | 2.20 | 0.14 |

As seen from the data of Table 2, the compound of the present invention has an enhanced temperature compensation effect.

EXAMPLE 3

A gelatin dispersion of zinc hydroxide was prepared. Combined with 12.5 grams of zinc hydroxide were 0.5 grams of carboxymethyl cellulose and 4% aqueous gelatin solution. The mixture was milled for 30 minutes in a ball mill filled with glass beads having an average diameter of 0.75 mm. Filtration of the glass beads resulted in a gelatin dispersion of zinc hydroxide.

A dispersion of compound No. 113 of the present invention was prepared by following the procedure of Example 1.

Using the gelatin dispersion and compound No. 113 dispersion prepared above as well as the emulsions, dye-providing substances, and additives described in Example 1, a photosensitive material No. 131 of the following formulation was prepared.

FORMULATION OF PHOTOSENSITIVE MATERIAL NO. 131

Sixth layer gelatin (coating weight 1000 mg/$m^2$)

hardener*3 (coating weight 20 mg/$m^2$)

silica*5 (coating weight 100 mg/$m^2$)

Fifth layer: Green-sensitive emulsion layer silver chlorobromide emulsion (bromine 50 mol%, coating weight 400 mg/$m^2$ of Ag)

sulfamide compound*6 (coating weight 180 mg/$m^2$)

silver benzotriazole emulsion (coating weight 100 mg/$m^2$ of Ag)

sensitizing dye D-1 (coating weight $10^{-6}$ mol/$m^2$)

compound No. 113 (coating weight 10 mg/$m^2$)

hardener*3 (coating weight 20 mg/$m^2$)

yellow dye-providing substance (A) (coating weight 500 mg/$m^2$)

gelatin (coating weight 1000 mg/$m^2$)

high-boiling solvent*4 (coating weight 800 mg/$m^2$)

surface-active agent*2 (coating weight 100 mg/$m^2$)

Fourth layer: Intermediate layer gelatin (coating weight 800 mg/$m^2$)

hardener*3 (coating weight 16 mg/$m^2$)

zinc hydroxide (coating weight 300 mg/$m^2$)

Third layer: Red-sensitive emulsion layer silver chlorobromide emulsion (bromine 80 mol%, coating weight 300 mg/$m^2$ of Ag)

sulfamide compound*6 (coating weight 180 mg/$m^2$)

silver benzotriazole emulsion (coating weight 100 mg/$m^2$ of Ag)

sensitizing dye D-2 (coating weight $8 \times 10^{-7}$ mol/$m^2$)

compound No. 113 (coating weight 10 mg/$m^2$)

hardener*3 (coating weight 20 mg/$m^2$)

magenta dye-providing substance (B) (coating weight 320 mg/$m^2$)

gelatin (coating weight 1000 mg/$m^2$)

high-boiling solvent*1 (coating weight 600 mg/$m^2$)

surface-active agent*2 (coating weight 100 mg/$m^2$)

Second layer: Intermediate layer gelatin (coating weight 800 mg/$m^2$)

hardener*3 (coating weight 16 mg/$m^2$)

zinc hydroxide (coating weight 300 mg/$m^2$)

First layer: Infrared-sensitive emulsion layer silver chlorobromide emulsion (bromine 50 mol%, coating weight 300 mg/$m^2$ of Ag)

sulfamide compound*6 (coating weight 180 mg/$m^2$)

silver benzotriazole emulsion (coating weight 100 mg/$m^2$ of Ag)

sensitizing dye D-3 (coating weight $10^{-8}$ mol/$m^2$)

compound No. 113 (coating weight 10 mg/$m^2$)

hardener*3 (coating weight 16 mg/$m^2$)

cyan dye-providing substance (C) (coating weight 320 mg/$m^2$)

gelatin (coating weight 1000 mg/$m^2$)

high-boiling solvent*4 (coating weight 600 mg/$m^2$)

surface-active agent*2 (coating weight 100 mg/$m^2$)
Support (polyethylene terephthalate 100 μm thick)
Note: The asterisked substances (*1-6) and other substances are the same as in Formulation of Example 1.

Photosensitive material Nos. 132 and 133 were prepared by following the same procedure as photosensitive material No. 131 except that compound No. 113 was replaced by compound Nos. 127 and 131 according to the present invention. For comparison purpose, photosensitive material No. 134 was prepared by following the same procedure as photosensitive material No. 131 except that the compound of the present invention was replaced by the compound (b) described in Japanese Patent Publication No. 60-19498 and having the formula:

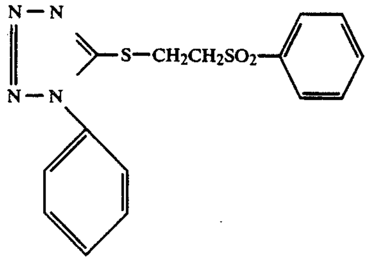

A dye-fixing material having an image-receiving layer was prepared.

First, 15 grams of the polymer used in preparing the dye-fixing material of Example 1 was dissolved in 200 ml of water and then combined with 100 grams of 10% lime-treated gelatin and 10 grams of compound (a) used in Example 2.

The mixture was evenly spread on a paper substrate laminated with polyethylene having titanium dioxide dispersed therein, thereby forming a dye-fixing layer having a uniform wet thickness of 85 μm, which was then dried.

Separately, 0.75 grams of gelatin hardener H-1, 0.25 grams of gelatin hardener H-2, 160 ml of water, and 100 grams of 10% lime-treated gelatin were evenly mixed. The mixture was uniformly coated on the dye-fixing layer to a wet film thickness of 60 μm. After drying, there was obtained a dye-fixing material.

Using photosensitive material Nos. 131-134 and the above-prepared dye-fixing material, the procedure of Example 1 was followed. The results are shown below.

TABLE 3

| Photosensitive material | Compound of invention | Color image | Heating at 90° C. for 25 sec. Dmax | Dmin | Heating at 95° C. for 25 sec. Dmax | Dmin |
|---|---|---|---|---|---|---|
| 131 | 113 | Yellow | 1.95 | 0.13 | 2.01 | 0.16 |
| | | Magenta | 2.04 | 0.14 | 2.08 | 0.17 |
| | | Cyan | 2.18 | 0.13 | 2.24 | 0.15 |
| 132 | 127 | Yellow | 1.87 | 0.12 | 1.93 | 0.15 |
| | | Magenta | 2.02 | 0.12 | 2.06 | 0.16 |
| | | Cyan | 2.15 | 0.14 | 2.19 | 0.18 |
| 133 | 131 | Yellow | 1.89 | 0.12 | 1.95 | 0.14 |
| | | Magenta | 2.10 | 0.11 | 2.14 | 0.14 |
| | | Cyan | 2.13 | 0.14 | 2.18 | 0.17 |
| 134 (comparison) | (b) | Yellow | 1.52 | 0.12 | 1.68 | 0.20 |
| | | Magenta | 1.84 | 0.14 | 1.98 | 0.24 |
| | | Cyan | 2.01 | 0.19 | 2.04 | 0.27 |

As evident from the data of Table 3, the compounds of the present invention have greater temperature compensation effect than the compound described in Japanese Patent Publication No. 60-19498.

EXAMPLE 4

A silver iodobromide emulsion was prepared.

In 3000 ml of water were dissolved 40 grams of gelatin and 26 grams of KBr. The solution was agitated while being kept at 50° C. A solution of 34 grams of silver nitrate in 200 ml of water was then added to the solution over 10 minutes. Thereafter, a solution of 3.3 grams of KI in 100 ml of water was added over 2 minutes. The resulting silver iodobromide emulsion was adjusted to such a pH that an excess salt precipitated, and the excess salt was filtered off. The emulsion was then adjusted to pH 6.0, obtaining a silver iodobromide emulsion in a yield of 400 grams.

A gelatin dispersion of a dye-providing substance was prepared by the same procedure as in Example 1 except that 7.5 grams of tricresyl phosphate was replaced by 10 grams of triisononyl phosphate as the solvent in the dispersion of the magenta dye-providing substance and the dye-providing substance (C) was replaced by a dye-providing substance (D) as defined below in the dispersion of the cyan dye-providing substance.

Cyan dye-providing substance (D):

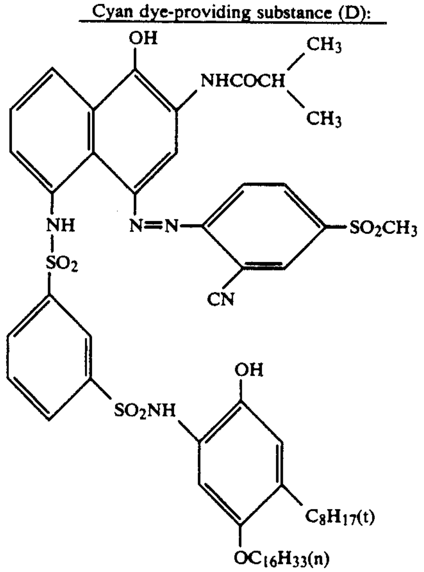

A gelatin dispersion of compound No. 101 of the present invention was prepared by the same procedure as in Example 1.

Using these preparations, there was prepared a color light-sensitive material No. 141 of multi-layer structure as shown in the following formulation:

FORMULATION OF PHOTOSENSITIVE MATERIAL NO. 141

Sixth layer
gelatin (coating weight 1000 mg/$m^2$)
base precursor*3 (coating weight 220 mg/$m^2$)
compound No. 101 (coating weight 10 mg/$m^2$)
Fifth layer: Blue-sensitive emulsion layer
silver iodobromide emulsion (iodine 10 mol%, coating weight 400 mg/$m^2$ of Ag)
sulfamide compound*4 (coating weight 180 mg/$m^2$)
base precursor*3 (coating weight 520 mg/$m^2$)

yellow dye-providing substance (A) (coating weight 400 mg/$m^2$)
gelatin (coating weight 1000 mg/$m^2$)
high-boiling solvent*1 (coating weight 800 mg/$m^2$)
surface-active agent*2 (coating weight 100 mg/$m^2$)
Fourth layer: Intermediate layer
gelatin (coating weight 800 mg/$m^2$)
base precursor*3 (coating weight 220 mg/$m^2$)
compound No. 101 (coating weight 10 mg/$m^2$)
Third layer: Green-sensitive emulsion layer
silver iodobromide emulsion (iodine 10 mol%, coating
weight 400 mg/$m^2$ of Ag)
sulfamide compound*4 (coating weight 180 mg/$m^2$)
sensitizing dye D-1 (coating weight $10^{-8}$ mol/$m^2$)
base precursor*3 (coating weight 515 mg/$m^2$)
magenta dye-providing substance (B) (coating weight 400 mg/$m^2$)
gelatin (coating weight 1000 mg/$m^2$)
high-boiling solvent*1 (coating weight 800 mg/$m^2$)
surface-active agent*2 (coating weight 100 mg/$m^2$)
Second layer: Intermediate layer
gelatin (coating weight 1000 mg/$m^2$)
base precursor*3 (coating weight 230 mg/$m^2$)
compound No. 101 (coating weight 10 mg/$m^2$)
First layer: Red-sensitive emulsion layer
silver iodobromide emulsion (iodine 10 mol%, coating
weight 400 mg/$m^2$ of Ag)
sulfamide compound*4 (coating weight 180 mg/$m^2$)
sensitizing dye D-2 (coating weight $8\times10^{-7}$ mol/$m^2$)
base precursor*3 (coating weight 515 mg/$m^2$)
cyan dye-providing substance (D) (coating weight 300 mg/$m^2$)
gelatin (coating weight 1000 mg/$m^2$)
high-boiling solvent*1 (coating weight 600 mg/$m^2$)
surface-active agent*2 (coating weight 100 mg/$m^2$)
Support (polyethylene terephthalate 100 μm thick)

*1 $(iso\text{-}C_9H_{19}O)_3P{=}O$

*2 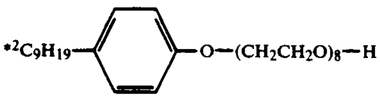

or p-acetylaminophenyl propiolic acid

*3 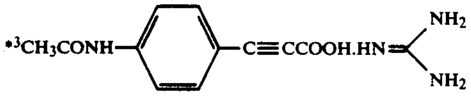

*4 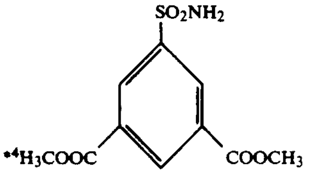

A dye-fixing material having an image-receiving layer was prepared.

First, 0.75 grams of gelatin hardener H-1, 0.25 grams of gelatin hardener H-2, 160 ml of water, and 100 grams of 10% lime-treated gelatin were evenly mixed. The mixture was uniformly spread on a paper substrate laminated with polyethylene having titanium dioxide dispersed therein to a wet thickness of 60 μm and then dried.

Separately, 15 grams of the polymer used in preparing the dye-fixing material of Example 1 was dissolved in 200 ml of water and then combined with 100 grams of 10% lime-treated gelatin. The mixture was evenly spread on the coating to a uniform wet thickness of 85 μm and then dried, obtaining a dye-fixing material.

The color light-sensitive material of the above-formulated multi-layer structure was exposed for 10 seconds at 2000 lux under a tungsten lamp through three color separation filters B, G, and R having a continuously varying density, and then evenly heated for 20 seconds on a heat block heated at 150° C. or 153° C.

The dye-fixing material dipped in water. The heated light-sensitive material was placed on the wet dye-fixing material such that their effective surfaces faced one another. After heating for 6 seconds on a heat block at 80° C., the dye-fixing material was peeled from the light-sensitive material whereupon the dye-fixing material bore a negative magenta image thereon. Then density of the negative image was measured by means of a Macbeth (RD-519) reflection densitometer. The results are shown in Table 4.

TABLE 4

| | Photosensitive material No. 141 | | | |
|---|---|---|---|---|
| | Heating at 150° C. for 20 sec. | | Heating at 153° C. for 20 sec. | |
| | Dmax | Dmin | Dmax | Dmin |
| Yellow | 1.92 | 0.16 | 1.98 | 0.19 |
| Magenta | 2.04 | 0.14 | 2.09 | 0.20 |
| Cyan | 2.07 | 0.17 | 2.12 | 0.19 |

As seen from the data of Table 4, the compound of the present invention has an enhanced temperature compensation effect.

EXAMPLE 5

Preparation of Silver Benzotriazole Emulsion

A silver benzotriazole emulsion was prepared as follows. Twenty eight (28) grams of gelatin and 13.2 grams of benzotriazole were dissolved in 300 ml of water. The resulting solution was agitated at 40° C. A solution of 17 grams silver nitrate in 100 ml water was added to the solution over a period of 2 minutes.

The resulting silver benzotriazole emulsion was adjusted to such pH that an excess salt precipitated, and the excess salt was filtered off. The emulsion was then adjusted to pH 6.30, obtaining a silver benzotriazole emulsion in a yield of 400 grams.

Preparation of Silver Halide Emulsion

A silver halide emulsion used in first and fifth layers was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.40 μm (bromine 50 mol%).

After rinsing with water and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

A silver halide emulsion used in a third layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.35 μm (bromine 80 mol%).

After water rinsing and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

Next, a dispersion of a dye-providing substance in gelatin was prepared as follows. Yellow, magenta, and cyan dye-providing substances (A), (B), and (C) are the same as used in Example 1.

Preparation of Gelatin Dispersion of Dye-Providing Substance

Five (5) grams of yellow dye-providing substance (A) was dissolved together with 0.5 grams of succinic acid-2-ethylhexyl ester sodium sulfonate and 10 grams of triisononyl phosphate in 30 ml of ethyl acetate by heating at about 60° C., obtaining a homogeneous solution. The solution was mixed with 30 grams of a 10 wt% lime-treated gelatin solution by agitation, and the mixture was dispersed with a homogenizer for 10 minutes at 10,000 rpm. This dispersion is called yellow dye-providing substance dispersion.

A magenta dye-providing substance dispersion was prepared by the same procedure as above except that magenta dye-providing substance (B) was used as the dye-providing substance and 7.5 grams of tricresyl phosphate was used as the high boiling solvent.

A cyan dye-providing substance dispersion was prepared by the same procedure as above except that cyan dye-providing substance (C) was used as the dye-providing substance.

A gelatin dispersion of compound No. 205 of the present invention was prepared as follows.

To 100 grams of an aqueous solution of 1% gelatin were added 5 grams of compound No. 205 and 0.5 grams of a surface-active agent of the following formula:

$$\begin{array}{l} \quad CH_2COOCH_2CH(C_2H_5)C_4H_9 \\ \quad | \\ NaO_3S-CHCOOCH_2CH(C_2H_5)C_4H_9 . \end{array}$$

The mixture was ground for 10 minutes in a ball mill filled with 100 grams of glass beads having an average diameter of about 0.6 mm. Filtration of the glass beads resulted in a gelatin dispersion of compound No. 205.

Using these preparations, there was prepared a color light-sensitive material No. 201 of multi-layer structure as shown in the following formulation:

FORMULATION OF PHOTOSENSITIVE MATERIAL NO. 201

Sixth layer
gelatin (coating weight 1000 mg/m²)
hardener*3 (coating weight 20 mg/m²)
silica*5 (coating weight 100 mg/m²)
Fifth layer: Green-sensitive emulsion layer
silver chlorobromide emulsion (bromine 50 mol%, coating weight 400 mg/m² of Ag)
sulfamide compound*6 (coating weight 180 mg/m²)
silver benzotriazole emulsion (coating weight 100 mg/m² of Ag)
sensitizing dye D-1 (coating weight $10^{-6}$ mol/m²)
compound No. 205 (coating weight 15 mg/m²)
hardener*3 (coating weight 20 mg/m²)
yellow dye-providing substance (A) (coating weight 500 mg/m²)
gelatin (coating weight 1000 mg/m²)
high-boiling solvent*4 (coating weight 800 mg/m²)
surface-active agent*2 (coating weight 100 mg/m²)
Fourth layer: Intermediate layer
gelatin (coating weight 800 mg/m²)
hardener*3 (coating weight 16 mg/m²)
Third layer: Red-sensitive emulsion layer
silver chlorobromide emulsion (bromine 80 mol%, coating weight 300 mg/m² of Ag)
sulfamide compound*6 (coating weight 180 mg/m²)
silver benzotriazole emulsion (coating weight 100 mg/m² of Ag)
sensitizing dye D-2 (coating weight $8\times10^{-7}$ mol/m²)
compound No. 205 (coating weight 15 mg/m²)
hardener*3 (coating weight 20 mg/m²)
magenta dye-providing substance (B) (coating weight 320 mg/m²)
gelatin (coating weight 1000 mg/m²)
high-boiling solvent*1 (coating weight 600 mg/m²)
surface-active agent*2 (coating weight 100 mg/m²)
Second layer: Intermediate layer
gelatin (coating weight 800 mg/m²)
hardener*3 (coating weight 16 mg/m²)
First layer: Infrared-sensitive emulsion layer
silver chlorobromide emulsion (bromine 50 mol%, coating weight 300 mg/m² of Ag)
sulfamide compound*6 (coating weight 180 mg/m²)
silver benzotriazole emulsion (coating weight 100 mg/m² of Ag)
sensitizing dye D-3 (coating weight $10^{-8}$ mol/m²)
compound No. 205 (coating weight 15 mg/m²)
hardener*3 (coating weight 20 mg/m²)
cyan dye-providing substance (C) (coating weight 320 mg/m²)
gelatin (coating weight 1000 mg/m²)
high-boiling solvent*4 (coating weight 600 mg/m²)
surface-active agent*2 (coating weight 100 mg/m²)
Support (polyethylene terephthalate 100 μm thick)

*1 tricresyl phosphate

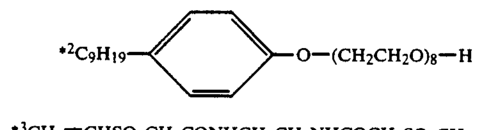

*3 $CH_2=CHSO_2CH_2CONHCH_2CH_2NHCOCH_2SO_2CH=CH_2$
*4 $(iso\text{-}C_9H_{19}O)_3P=O$
*5 size 4 μm -continued

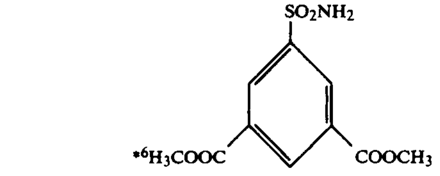

Dye-providing substances (A), (B), and (C), and sensitizing dyes D-1, D-2, and D-3 are the same as in Example 1.

Photosensitive material Nos. 202 and 203 were prepared by following the same procedure as photosensitive material No. 201 except that compound No. 205 was replaced by compound Nos. 210 and 220 according to the present invention. For comparison purpose, photosensitive material No. 204 was prepared by following the same procedure as photosensitive material No. 201 except that the compound of the present invention was omitted.

Next, the preparation of a dye-fixing material will be described.

Preparation of Dye-Fixing Material

In 200 ml of water was dissolved 15 grams of a polymer having the structure as defined below. The solution was homogeneously mixed with 100 grams of 10 wt% lime-treated gelatin and 7 grams of guanidine carbonate. The resulting mixture was uniformly spread onto a paper substrate laminated with polyethylene having titanium dioxide dispersed therein, thereby forming a dye-fixing layer having a uniform wet thickness of 85 μm, which was then dried.

Separately, 0.75 grams of gelatin hardener H-1, 0.25 grams of gelatin hardener H-2, 160 ml of water, and 100 grams of 10% lime-treated gelatin were evenly mixed. The mixture was uniformly coated on the dye-fixing layer to a wet film thickness of 60 μm. After drying, there was obtained a dye-fixing material.

Polymer structure:

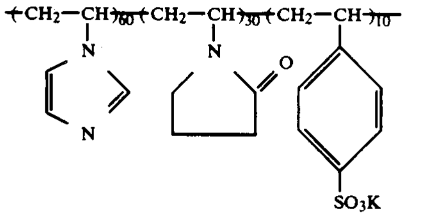

(intrinsic viscosity 0.3473 as measured in 1/20 M $Na_2HPO_4$ aqueous solution at 30° C.)

Gelatin hardener H-1:
$CH_2{=}CHSO_2CH_2CONHCH_2CH_2NHCOCH_2SO_2CH{=}CH_2$

Gelatin hardener H-2:
$CH_2{=}CHSO_2CH_2CONHCH_2CH_2CH_2NHCOCH_2SO_2CH{=}CH_2$

Multilayered color light-sensitive material Nos. 201–204 were exposed for one second at 500 lux under a tungsten lamp through three color separation filters G, R, and IR having a continuously varying density. It should be noted that filter G is a 500–600 nm band pass filter, filter R is a 600–700 nm band pass filter, and filter IR is a filter transmitting light having wavelengths of at least 700 nm.

Water was applied by means of a wire bar in an amount of 20 ml per square meter to the emulsion surface of the thus exposed light-sensitive material, which was superimposed on the dye-fixing material such that their effective surfaces faced one another. After heating for 20 seconds through heat rollers at such a temperature such that the temperature of the wet film reached 93° or 98° C., the dye-fixing material was peeled from the light-sensitive material. The dye-fixing material then bore thereon clear images of yellow (Y), magenta (M), and cyan (C) corresponding to the three color separation filters. The maximum density (Dmax) and minimum density (Dmin) of the respective color images were measured by means of a Macbeth (RD-519) reflection densitometer. The results are shown in Table 5.

TABLE 5

| Photo-sensitive material | Compound of invention | at | Heating 93° C. for 20 sec. Dmax | Dmin | Heating at 98° C. for 20 sec. Dmax | Dmin |
|---|---|---|---|---|---|---|
| 201 | 129 | Yellow | 1.80 | 0.11 | 1.84 | 0.17 |
| | | Magenta | 2.03 | 0.12 | 2.07 | 0.14 |
| | | Cyan | 2.12 | 0.14 | 2.15 | 0.19 |
| 202 | 117 | Yellow | 1.78 | 0.10 | 1.82 | 0.14 |
| | | Magenta | 2.00 | 0.11 | 2.03 | 0.13 |
| | | Cyan | 2.08 | 0.12 | 2.14 | 0.16 |
| 203 | 116 | Yellow | 1.84 | 0.13 | 1.89 | 0.20 |
| | | Magenta | 2.01 | 0.14 | 2.07 | 0.19 |
| | | Cyan | 2.13 | 0.12 | 2.18 | 0.20 |
| 204 (control) | — | Yellow | 1.84 | 0.12 | 1.96 | 0.40 |
| | | Magenta | 2.02 | 0.14 | 2.18 | 0.35 |
| | | Cyan | 2.15 | 0.12 | 2.21 | 0.28 |

As evident from the data in Table 5, the photosensitive materials containing the compounds of the present invention experience a smaller increase of Dmax and Dmin when the developing temperature is raised by 5 degrees' whereas the control material free of the compound of the present invention produces markedly increased fog. It is thus evident that the compounds of the present invention have great temperature compensation effect.

EXAMPLE 6

A gelatin dispersion of zinc hydroxide was prepared. Combined with 4% aqueous gelatin solution were 12.5 rams of zinc hydroxide and 2 grams of a surface-active agent of the formula:

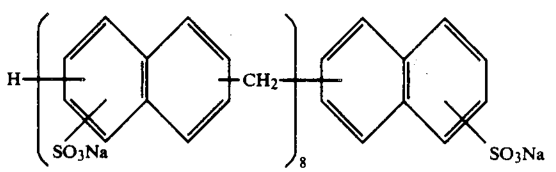

The mixture was ground for 30 minutes in a ball mill filled with glass beads having an average diameter of 0.75 mm. Filtration of the glass beads resulted in a gelatin dispersion of zinc hydroxide.

Using this dispersion as well as the emulsions, dye-providing substances, and additives described in Example 5, photosensitive material No. 221 was prepared as formulated below.

FORMULATION OF PHOTOSENSITIVE MATERIAL NO. 221

Sixth layer gelatin (coating weight 1000 $mg/m^2$)
hardener*3 (coating weight 20 $mg/m^2$)
silica*5 (coating weight 100 $mg/m^2$)
zinc hydroxide (coating weight 800 $mg/m^2$)
Fifth layer: Green-sensitive emulsion layer
silver chlorobromide emulsion (bromine 50 mol%, coating weight 400 $mg/m^2$ of Ag)
sulfamide compound*6 (coating weight 180 $mg/m^2$)
silver benzotriazole emulsion (coating weight 100 $mg/m^2$ of Ag)
sensitizing dye D-1 (coating weight $10^{-6}$ $mol/m^2$)
hardener*3 (coating weight 20 $mg/m^2$)
yellow dye-providing substance (A) (coating weight 500 $mg/m^2$)
gelatin (coating weight 1000 $mg/m^2$)
high-boiling solvent*4 (coating weight 800 $mg/m^2$)
surface-active agent*2 (coating weight 100 $mg/m^2$)
Fourth layer: Intermediate layer
gelatin (coating weight 800 $mg/m^2$)
hardener*3 (coating weight 16 $mg/m^2$)
Third layer: Red-sensitive emulsion layer
silver chlorobromide emulsion (bromine 80 mol%, coating weight 300 $mg/m^2$ of Ag)
sulfamide compound*6 (coating weight 180 $mg/m^2$)
silver benzotriazole emulsion (coating weight 100 $mg/m^2$ of Ag)
sensitizing dye D-2 (coating weight $8\times10^{-7}$ $mol/m^2$)
hardener*3 (coating weight 20 $mg/m^2$)
magenta dye-providing substance (B) (coating weight 320 $mg/m^2$)
gelatin (coating weight 1000 $mg/m^2$)
high-boiling solvent*1 (coating weight 600 $mg/m^2$)
surface-active agent*2 (coating weight 100 $mg/m^2$)
Second layer: Intermediate layer
gelatin (coating weight 800 $mg/m^2$)
hardener*3 (coating weight 16 $mg/m^2$)
First layer: Infrared-sensitive emulsion layer
silver chlorobromide emulsion (bromine 50 mol%, coating weight 300 $mg/m^2$ of Ag)
sulfamide compound*6 (coating weight 180 $mg/m^2$)
silver benzotriazole emulsion (coating weight 100 $mg/m^2$ of Ag)
sensitizing dye D-3 (coating weight $10^{-8}$ $mol/m^2$)
hardener*3 (coating weight 16 $mg/m^2$)
cyan dye-providing substance (C) (coating weight 320 $mg/m^2$)
gelatin (coating weight 1000 $mg/m^2$)
high-boiling solvent*4 (coating weight 600 $mg/m^2$)
surface-active agent*2 (coating weight 100 $mg/m^2$)
Support (polyethylene terephthalate 100 μm thick)

Note: The asterisked substances (*1-6) and other substances are the same as in Formulation of Example 5.

A dye-fixing material having an image-receiving layer was prepared.

First, 15 grams of the polymer used in preparing the dye-fixing material of Example 5 was dissolved in 200 ml of water and then combined with 100 grams of 10% lime-treated gelatin, 8 grams of compound (a) of the following formula, and 3 grams of a gelatin dispersion of compound No. 205 of the present invention dispersed by the same method as in Example 5.

Structure of compound (a):

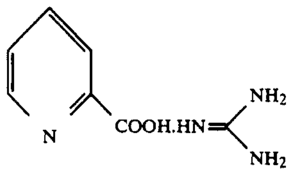

The mixture was evenly spread on a paper substrate laminated with polyethylene having titanium dioxide dispersed therein, thereby forming a dye-fixing layer having a uniform wet thickness of 85 μm, which was then dried.

Separately, 0.75 grams of gelatin hardener H-1, 0.25 grams of gelatin hardener H-2, 160 ml of water, and 100 grams of 10% lime-treated gelatin were evenly mixed. The mixture was uniformly coated on the dye-fixing layer to a wet film thickness of 60 μm. After drying, there was obtained a dye-fixing material.

Using photosensitive material No. 221 and the above prepared dye-fixing material, the procedure of Example 5 was followed. The results are shown below.

TABLE 6

| | Photosensitive material No. 221 | | | |
|---|---|---|---|---|
| | Heating at 93° C. for 20 sec. | | Heating at 98° C. for 20 sec. | |
| | Dmax | Dmin | Dmax | Dmin |
| Yellow | 2.04 | 0.12 | 2.08 | 0.18 |
| Magenta | 2.08 | 0.14 | 2.12 | 0.17 |
| Cyan | 2.20 | 0.16 | 2.26 | 0.19 |

As seen from the data of Table 6, the compound of the present invention has an enhanced temperature compensation effect.

EXAMPLE 7

A dispersion of a dye-providing substance in gelatin was prepared as follows. Dye-providing substances (A), (B), and (C) are the same as used in Example 1.

Five (5) grams of yellow dye-providing substance (A) was dissolved together with 0.5 grams of succinic acid-2ethylhexyl ester sodium sulfonate, 2.5 grams of triisononyl phosphate, and 0.1 gram of a mercapto compound having the formula (c):

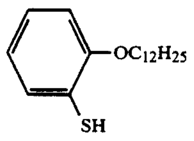

in 30 ml of ethyl acetate by heating at about 60° C., obtaining a homogeneous solution. The solution was mixed with 100 grams of a 10 wt% lime-treated gelatin solution by agitation, and the mixture was dispersed with a homogenizer for 10 minutes at 10,000 rpm. This dispersion is called yellow dye-providing substance dispersion.

A magenta dye-providing substance dispersion was prepared by the same procedure as above except that a magenta dye-providing substance (B) was used as the dye-providing substance and 7.5 grams of tricresyl phosphate was used as the high boiling solvent.

A cyan dye-providing substance dispersion was prepared by the same procedure as above except that a cyan dye-providing substance (C) was used as the dye-providing substance.

A dispersion of compound No. 227 of the present invention was prepared by following the procedure of Example 5.

Using the dispersions of the dye-providing substances and compound No. 227 prepared above as well as the gelatin dispersion of zinc hydroxide described in Example 6, the emulsions and additives described in Example 5, a photosensitive material No. 231 of the following formulation was prepared.

FORMULATION OF PHOTOSENSITIVE MATERIAL NO. 231

Sixth layer
gelatin (coating weight 1000 mg/$m^2$)
hardener 3 (coating weight 20 mg/$m^2$)
silica*5 (coating weight 100 mg/$m^2$)
Fifth layer: Green-sensitive emulsion layer
silver chlorobromide emulsion (bromine 50 mol%, coating weight 400 mg/$m^2$ of Ag)
mercapto compound*6 (coating weight 180 mg/$m^2$)
silver benzotriazole emulsion (coating weight 100 mg/$m^2$ of Ag)
sensitizing dye D-1 (coating weight $10^{-6}$ mol/$m^2$)
compound No. 227 (coating weight 8 mg/$m^2$)
hardener*3 (coating weight 20 mg/$m^2$)
yellow dye-providing substance (A) (coating weight 500 mg/$m^2$)
gelatin (coating weight 1000 mg/$m^2$)
high-boiling solvent*4 (coating weight 800 mg/$m^2$)
surface-active agent*2 (coating weight 100 mg/$m^2$)
Fourth layer: Intermediate layer
gelatin (coating weight 800 mg/$m^2$)
hardener*3 (coating weight 16 mg/$m^2$)
zinc hydroxide (coating weight 300 mg/$m^2$)
Third layer: Red-sensitive emulsion layer
silver chlorobromide emulsion (bromine 80 mol%, coating weight 300 mg/$m^2$ of Ag)
mercapto compound*6 (coating weight 180 mg/$m^2$)
silver benzotriazole emulsion (coating weight 100 mg/$m^2$ of Ag)
sensitizing dye D-2 (coating weight $8\times10^{-7}$ mol/$m^2$)
compound No. 227 (coating weight 8 mg/$m^2$)
hardener*3 (coating weight 20 mg/$m^2$)
magenta dye-providing substance (B) (coating weight 320 mg/$m^2$)
gelatin (coating weight 1000 mg/$m^2$)
high-boiling solvent*1 (coating weight 600 mg/$m^2$)
surface-active agent*2 (coating weight 100 mg/$m^2$)
Second layer: Intermediate layer
gelatin (coating weight 800 mg/$m^2$)
hardener*3 (coating weight 16 mg/$m^2$)
zinc hydroxide (coating weight 300 mg/$m^2$)
First layer: Infrared-sensitive emulsion layer
silver chlorobromide emulsion (bromine 50 mol%, coating weight 300 mg/$m^2$ of Ag)
mercapto compound*6 (coating weight 180 mg/$m^2$)
silver benzotriazole emulsion (coating weight 100 mg/$m^2$ of Ag)
sensitizing dye D-3 (coating weight $10^{-8}$ mol/$m^2$)
compound No. 227 (coating weight 8 mg/$m^2$)
hardener*3 (coating weight 16 mg/$m^2$)
cyan dye-providing substance (C) (coating weight 320 mg/$m^2$)
gelatin (coating weight 1000 mg/$m^2$)
high-boiling solvent*4 (coating weight 600 mg/$m^2$)
surface-active agent*2 (coating weight 100 mg/$m^2$)
Support (polyethylene terephthalate 100 μm thick)

*1 tricresyl phosphate

*2 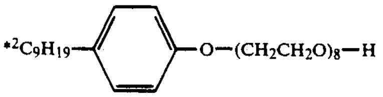

*3 $CH_2=CHSO_2CH_2CONHCH_2CH_2NHCOCH_2SO_2CH=CH_2$

*4 $(iso\text{-}C_9H_{19}O)_3P=O$

*5 size 4 μm

*6 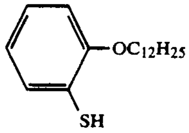

Photosensitive material Nos. 232 and 233 were prepared by following the same procedure as photosensitive material No. 231 except that compound No. 227 was replaced by compound Nos. 234 and 205 according to the present invention. For comparison purpose, photosensitive material No. 234 was prepared by following the same procedure as photosensitive material No. 231 except that the compound of the present invention was omitted.

A dye-fixing material having an image-receiving layer was prepared.

First, 15 grams of the polymer used in preparing the dye-fixing material of Example 5 was dissolved in 200 ml of water and then combined with 100 grams of 10% lime-treated gelatin and 10 grams of compound (a) of the following formula:

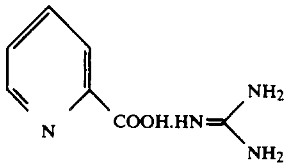

The mixture was evenly spread on a paper substrate laminated with polyethylene having titanium dioxide dispersed therein, thereby forming a dye-fixing layer having a uniform wet thickness of 85 μm, which was then dried.

Separately, 0.75 grams of gelatin hardener H-1, 0.25 grams of gelatin hardener H-2, 160 ml of water, and 100 grams of 10% lime-treated gelatin were evenly mixed. The mixture was uniformly coated on the dye-fixing layer to a wet film thickness of 60 μm. After drying, there was obtained a dye-fixing material.

Multilayered color light-sensitive material Nos. 231234 were exposed for one second at 500 lux under a tungsten lamp through three color separation filters G, R, and IR having a continuously varying density. It should be noted that filter G is a 500-600 nm band pass filter, filter R is a 600-700 nm band pass filter, and filter IR is a filter transmitting light having wavelengths of at least 700 nm.

Water was applied by means of a wire bar in an amount of 20 ml per square meter to the emulsion surface of the thus exposed light-sensitive material, which was superimposed on the dye-fixing material such that their effective surfaces faced one another. After heating for 25 seconds through heat rollers at such a temperature such that the temperature of the wet film reached 90° or 95° C., the dye-fixing material was peeled from the light-sensitive material. The dye-fixing material then bore thereon clear images of yellow (Y), magenta (M), and cyan (C) corresponding to the three color separation filters. The maximum density (Dmax) and minimum density (Dmin) of the respective color images were measured by means of a Macbeth (RD-519) reflection densitometer. The results are shown in Table 7.

TABLE 7

| Photo-sensitive material | Compound of invention | Color image | Heating at 90° C. for 25 sec. Dmax | Dmin | Heating at 95° C. for 25 sec. Dmax | Dmin |
|---|---|---|---|---|---|---|
| 231 | 227 | Yellow | 2.02 | 0.16 | 2.06 | 0.19 |
| | | Magenta | 2.00 | 0.17 | 2.04 | 0.19 |
| | | Cyan | 2.23 | 0.15 | 2.27 | 0.18 |
| 232 | 234 | Yellow | 1.98 | 0.18 | 2.03 | 0.20 |
| | | Magenta | 2.01 | 0.17 | 2.06 | 0.19 |
| | | Cyan | 2.12 | 0.14 | 2.18 | 0.17 |
| 233 | 205 | Yellow | 1.76 | 0.15 | 1.80 | 0.17 |
| | | Magenta | 1.93 | 0.15 | 1.98 | 0.18 |
| | | Cyan | 2.05 | 0.14 | 2.09 | 0.17 |
| 234 (comparison) | — | Yellow | 2.04 | 0.18 | 2.15 | 0.30 |
| | | Magenta | 2.02 | 0.19 | 2.11 | 0.29 |
| | | Cyan | 2.24 | 0.14 | 2.31 | 0.31 |

As evident from the data of Table 7, the compounds of the present invention have great temperature compensation effect.

EXAMPLE 8

A silver iodobromide emulsion was prepared.

In 3000 ml of water were dissolved 40 grams of gelatin and 26 grams of KBr. The solution was agitated while being kept at 50° C. A solution of 34 grams of silver nitrate in 200 ml of water was then added to the solution over 10 minutes. Thereafter, a solution of 3.3 grams of KI in 100 ml of water was added over 2 minutes. The resulting silver iodobromide emulsion was adjusted to such a pH that an excess salt precipitated, and the excess salt was filtered off. The emulsion was then adjusted to pH 6.0, obtaining a silver iodobromide emulsion in a yield of 400 grams.

A gelatin dispersion of a dye-providing substance was prepared by the same procedure as in Example 5 except that 7.5 grams of tricresyl phosphate was replaced by 10 grams of triisononyl phosphate as the solvent in the dispersion of the magenta dye-providing substance and the dye-providing substance (C) was replaced by a dye-providing substance (D) as defined below in the dispersion of the cyan dye-providing substance.

Cyan dye-providing substance (D):

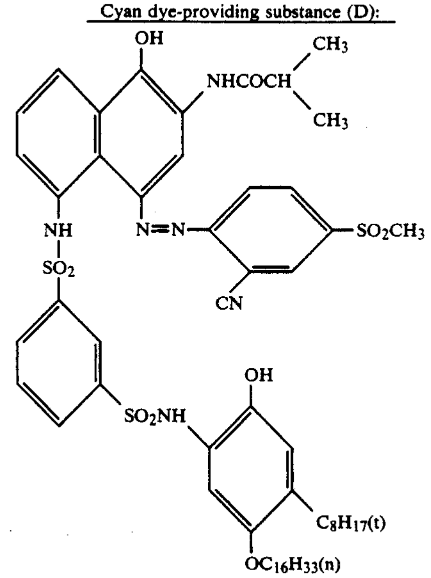

A gelatin dispersion of compound No. 205 of the present invention was prepared by the same procedure as in Example 5.

Using these preparations, there was prepared a color light-sensitive material No. 241 of multi-layer structure as shown in the following formulation:

FORMULATION OF PHOTOSENSITIVE MATERIAL NO. 241

Sixth layer
gelatin (coating weight 1000 mg/$m^2$)
base precursor*3 (coating weight 220 mg/$m^2$)
compound No. 205 (coating weight 10 mg/$m^2$)
Fifth layer: Blue-sensitive emulsion layer
silver iodobromide emulsion (iodine 10 mol % coating weight 400 mg/$m^2$ of Ag)
sulfamide compound*4 (coating weight 180 mg/$m^2$)
base precursor*3 (coating weight 520 mg/$m^2$)
yellow dye-providing substance (A) (coating weight 400 mg/$m^2$)
gelatin (coating weight 1000 mg/$m^2$)
high-boiling solvent*1 (coating weight 800 mg/$m^2$)
surface-active agent*2 (coating weight 100 mg/$m^2$)
Fourth layer: Intermediate layer
gelatin (coating weight 1200 mg/$m^2$)
base precursor*3 (coating weight 220 mg/$m^2$)
compound No. 205 (coating weight 10 mg/$m^2$)
Third layer: Green-sensitive emulsion layer
silver iodobromide emulsion (iodine 10 mol %, coating weight 400 mg/$m^2$ of Ag)
sulfamide compound*4 (coating weight 180 mg/$m^2$)
sensitizing dye D-1 (coating weight $10^8$ mol/$m^2$)
base precursor*3 (coating weight 515 mg/$m^2$) magenta dye-providing substance (B) (coating weight 400 mg/$m^2$)
gelatin (coating weight 1000 mg/$m^2$)
high-boiling solvent*1 (coating weight 800 mg/$m^2$)
surface-active agent*2 (coating weight 100 mg/$m^2$)
Second layer: Intermediate layer
gelatin (coating weight 1000 mg/$m^2$)
base precursor*3 (coating weight 230 mg/$m^2$)
compound No. 205 (coating weight 10 mg/$m^2$)
First layer: Red-sensitive emulsion layer silver iodobromide emulsion (iodine 10 mol %, coating weight 400 mg/$m^2$ of Ag)
sulfamide compound*4 (coating weight 180 mg/$m^2$)
sensitizing dye D-2 (coating weight $8\times10^{-7}$ mol/$m^2$)
base precursor*3 (coating weight 515 mg/$m^2$)
cyan dye-providing substance (D) (coating weight 300 mg/$m^2$)
gelatin (coating weight 1000 mg/$m^2$)
high-boiling solvent*1 (coating weight 600 mg/$m^2$)
surface-active agent*2 (coating weight 100 mg/$m^2$)
Support (polyethylene terephthalate 100 μm thick)

*1 $(iso\text{-}C_9H_{19}O)_3P{=}O$

*2
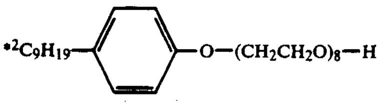

*3
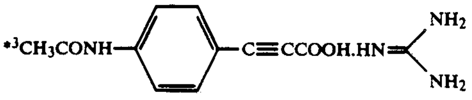

*4
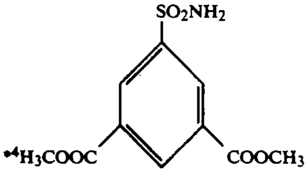

A dye-fixing material having an image-receiving layer was prepared.

First, 0.75 grams of gelatin hardener H-1, 0.25 grams of gelatin hardener H-2, 160 ml of water, and 100 grams of 10% lime-treated gelatin were evenly mixed. The mixture was uniformly spread on a paper substrate laminated with polyethylene having titanium dioxide dispersed therein to a wet thickness of 60 μm and then dried.

Separately, 15 grams of the polymer used in preparing the dye-fixing material of Example 5 was dissolved in 200 ml of water and then combined with 100 grams of 10% lime-treated gelatin. The mixture was evenly spread on the coating to a uniform wet thickness of 85 μm and then dried, obtaining a dye-fixing material.

The color light-sensitive material of the aboveformulated multi-layer structure was exposed for 10 seconds at 2000 lux under a tungsten lamp through three color separation filters B, G, and R having a continuously varying density, and then evenly heated for 20 seconds on a heat block heated at 150° C. or 153° C.

The dye-fixing material was dipped in water. The heated light-sensitive material was placed on the wet dyefixing material such that their effective surfaces faced one another. After heating for 6 seconds on a heat block at 80° C., the dye-fixing material was peeled from the light-sensitive material whereupon the dye-fixing material bore a nagative magenta image thereon. The density of the nagative image was measured by means of a Macbeth (RD-519) reflection densitometer. The results are shown in Table 8.

TABLE 8

| | Photosensitive material No. 241 | | | |
|---|---|---|---|---|
| | Heating at 150° C. for 20 sec. | | Heating at 153° C. for 20 sec. | |
| | Dmax | Dmin | Dmax | Dmin |
| Yellow | 1.90 | 0.18 | 1.92 | 0.22 |
| Magenta | 2.02 | 0.17 | 2.04 | 0.19 |
| Cyan | 2.08 | 0.19 | 2.12 | 0.21 |

As seen from the data of Table 8, the compound of the present invention has an enhanced temperature compensation effect.

EXAMPLE 9

Preparation of Silver Acetylene Dispersion

In 1000 ml of water and 200 ml of ethanol were dissolved 20 grams of gelatin and 4.6 grams of 4-acetylaminophenyl acetylene. The solution was agitated at 40° C.

To the solution was added 4.5 grams of silver nitrate in 200 ml of water over a period of 5 minutes. The dispersion was adjusted to such pH that an excess salt precipitated. The excess salt was filtered off, and the dispersion was adjusted to pH 6.3, obtaining a silver acetylene dispersion in a yield of 400 grams.

Preparation of Silver Benzotriazole Emulsion

A silver benzotriazole emulsion was prepared by dissolving 28 grams of gelatin and 13.2 grams of benzotriazole in 300 ml of water. The solution was agitated at 40° C. A solution of 17 grams silver nitrate in 100 ml water was added to the solution over a period of 2 minutes.

The resulting silver benzotriazole emulsion was adjusted to such pH that an excess salt precipitated, and the excess salt was filtered off. The emulsion was then adjusted to pH 6.30, obtaining a silver benzotriazole emulsion in a yield of 400 grams.

Preparation of Silver Halide Emulsion

A silver halide emulsion used in a first layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.40 μm (bromine 50 mol %).

After rinsing with water and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

A silver halide emulsion used in a third layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.35 μm (bromine 80 mol %).

After water rinsing and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

Next, a dispersion of a dye-providing substance in gelatin was prepared as follows. Dye-providing substances (A), (B), and (C) are the same as used in Example 1.

Preparation of Gelatin Dispersion of Dye-Providing Substance

Five (5) grams of yellow dye-providing substance (A) was dissolved together with 0.5 grams of succinic acid-2-ethylhexyl ester sodium sulfonate, 5 grams of triisononyl phosphate, and 0.2 grams of a reducing agent of the following formula in 30 ml of ethyl acetate by heating at about 60° C., obtaining a homogeneous solution. The solution was mixed with 100 grams of a 10 wt % lime-treated gelatin solution by agitation, and the mixture was dispersed with a homogenizer for 10 minutes at 10,000 rpm. This dispersion is called yellow dye-providing substance dispersion.

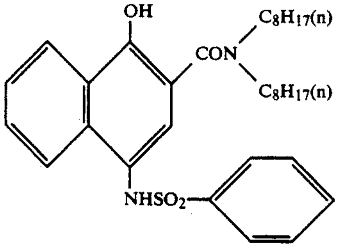

A magenta dye-providing substance dispersion was prepared by the same procedure as above except that magenta dye-providing substance (B) was used as the dye-providing substance and 7.5 grams of tricresyl phosphate was used as the high boiling solvent.

A cyan dye-providing substance dispersion was prepared by the same procedure as above except that cyan dye-providing substance (C) was used as the dye-providing substance.

A gelatin dispersion of compound No. 315 of the present invention was prepared as follows.

To 100 grams of an aqueous solution of 1% gelatin were added 5 grams of compound No. 315 and 0.5 grams of a surface-active agent of the following formula:

$$NaO_3S-CH(CH_2COOCH_2CH(C_2H_5)C_4H_9)COOCH_2CH(C_2H_5)C_4H_9.$$

The mixture was ground for 10 minutes in a ball mill filled with 100 grams of glass beads having an average diameter of about 0.6 mm. Filtration of the glass beads resulted in a gelatin dispersion of compound No. 315 (average particle size 0.5 μm).

A gelatin dispersion of zinc hydroxide was prepared by combining 12.5 grams of zinc hydroxide and 1 gram of carboxymethyl cellulose with 4% aqueous gelatin solution. The mixture was milled for 30 minutes in a mill filled with glass beads having an average diameter of 0.75 mm.

Filtration of the glass beads resulted in a gelatin dispersion of zinc hydroxide (average particle size 0.3 μm).

Using these preparations, there was prepared a color light-sensitive material No. 301 of multi-layer structure as shown in the following formulation:

FORMULATION OF PHOTOSENSITIVE MATERIAL NO. 301

Sixth layer
gelatin (coating weight 100 mg/m$^2$)
hardener*3 (coating weight 20 mg/m$^2$)
silica*5 (coating weight 100 mg/m$^2$)
surface-active agent*2 (coating weight 100 mg/m$^2$)
compound No. 315 (coating weight 10 mg/m$^2$)
Fifth layer: Green-sensitive emulsion layer
silver chlorobromide emulsion (bromine 50 mol %, coating weight 400 mg/m$^2$ of Ag)
sulfamide compound*6 (coating weight 20 mg/m$^2$)
silver acetylene (coating weight 50 mg/m$^2$ of Ag)
sensitizing dye D-1 (coating weight $10^{-6}$ mol/m$^2$)
hardener*3 (coating weight 20 mg/m$^2$)
zinc hydroxide (coating weight 200 mg/m$^2$)
yellow dye-providing substance (A) (coating weight 500 mg/m$^2$)
gelatin (coating weight 600 mg/m$^2$)
high-boiling solvent*4 (coating weight 800 mg/m$^2$)
Fourth layer: Intermediate layer
gelatin (coating weight 800 mg/m$^2$)
hardener*3 (coating weight 16 mg/m$^2$)
surface-active agent*2 (coating weight 100 mg/m$^2$)
compound No. 315 (coating weight 10 mg/m$^2$)
Third layer: Red-sensitive emulsion layer
silver chlorobromide emulsion (bromine 80 mol %, coating weight 300 mg/m$^2$ of Ag)
sulfamide compound*6 (coating weight 13 mg/m$^2$)
silver benzotriazole emulsion (coating weight 20 mg/m$^2$ of Ag)
sensitizing dye D-2 (coating weight $8 \times 10^{-7}$ mol/m$^2$)
silver acetylene (coating weight 50 mg/m of Ag)
hardener*3 (coating weight 20 mg/m$^2$)
zinc hydroxide (coating weight 200 mg/m$^2$)
magenta dye-providing substance (B) (coating weight 320 mg/m$^2$)
gelatin (coating weight 500 mg/m$^2$)
high-boiling solvent*1 (coating weight 600 mg/m$^2$)
Second layer: Intermediate layer
gelatin (coating weight 800 mg/m$^2$)
hardener*3 (coating weight 16 mg/m$^2$)
First layer: Infrared-sensitive emulsion layer
silver chlorobromide emulsion (bromine 50 mol %, coating weight 300 mg/m$^2$ of Ag)
sulfamide compound*6 (coating weight 13 mg/m$^2$)
silver benzotriazole emulsion (coating weight 100 mg/m$^2$ of Ag)
sensitizing dye D-3 (coating weight $10^{-8}$ mol/m$^2$)
compound No. 315 (coating weight 12 mg/m$^2$)
hardener*3 (coating weight 16 mg/m$^2$)
zinc hydroxide (coating weight 200 mg/m$^2$)
cyan dye-providing substance (C) (coating weight 320 mg/m$^2$)
gelatin (coating weight 500 mg/m$^2$)
high-boiling solvent*4 (coating weight 600 mg/m$^2$)
surface-active agent*2 (coating weight 100 mg/m$^2$)
Support (polyethylene terephthalate 100 μm thick)

*1 tricresyl phosphate

*2 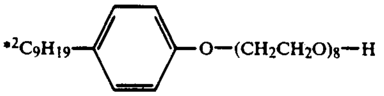

*3 $CH_2{=}CHSO_2CH_2CONHCH_2CH_2NHCOCH_2SO_2CH{=}CH_2$

*4 $(iso\text{-}C_9H_{19}O)_3P{=}O$

*5 size 4 μm

*6 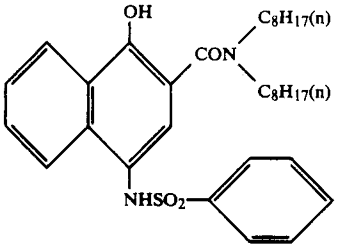

Photosensitive material Nos. 302 and 303 were prepared by following the same procedure as photosensitive material No. 301 except that compound No. 315 was replaced by compound Nos. 331 and 339 according to the present invention. For comparison purpose, photosensitive material No. 304 was prepared by following the same procedure as photosensitive material No. 301 except that the compound of the present invention was omitted, and another photosensitive material No. 305 was prepared by the same procedure except that the compound of the present invention was replaced by a compound (d) which releases phenylmercaptotetrazole having an unsubstituted benzene ring and is represented by the following formula:

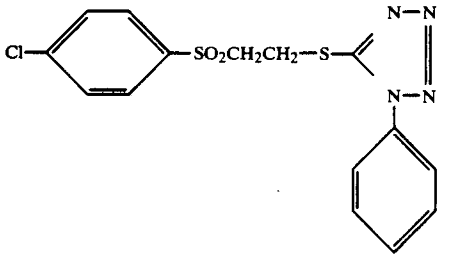

Next, the preparation of a dye-fixing material will be described.

Preparation of Dye-Fixing Material

In 200 ml of water was dissolved 15 grams of a polymer having the structure as defined below. The solution was homogeneously mixed with 100 grams of 10 wt % lime-treated gelatin and 9 grams of guanidine picolinate. The resulting mixture was uniformly spread onto a paper substrate laminated with polyethylene having titanium dioxide dispersed therein, thereby forming a dye-fixing layer having a uniform wet thickness of 85 μm, which was then dried.

Separately, 0.75 grams of gelatin hardener H-1, 0.25 grams of gelatin hardener H-2, 160 ml of water, and 100 grams of 10% lime-treated gelatin were evenly mixed. The mixture was uniformly coated on the dye-fixing layer to a wet film thickness of 60 μm. After drying, there was obtained a dye-fixing material.

Polymer structure:

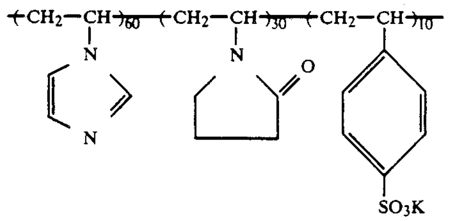

(intrinsic viscosity 0.3473 as measured in 1/20M $Na_2HPO_4$ aqueous solution at 30° C.)

Gelatin hardener H-1:
$CH_2{=}CHSO_2CH_2CONHCH_2CH_2NHCOCH_2SO_2CH{=}CH_2$

Gelatin hardener H-2:
$CH_2{=}CHSO_2CH_2CONHCH_2CH_2CH_2NHCOCH_2SO_2CH{=}CH_2$

Multilayered color light-sensitive material Nos. 301–305 were exposed for one second at 500 lux under a tungsten lamp through three color separation filters G, R, and IR having a continuously varying density. It should be noted that filter G is a 500–600 nm band pass filter, filter R is a 600–700 nm band pass filter, and filter IR is a filter transmitting light having wavelengths of at least 700 nm.

Water was applied by means of a wire bar in an amount of 10 ml per square meter to the emulsion surface of the thus exposed light-sensitive material, which was superimposed on the dye-fixing material such that their effective surfaces faced one another. After heating for 25 seconds through heat rollers at such a temperature such that the temperature of the wet film reached 90° or 95° C., the dyefixing material was peeled from the light-sensitive material. The dye-fixing material then bore thereon clear images of yellow (Y), magenta (M), and cyan (C) corresponding to the three color separation filters. The maximum density (Dmax) and minimum density (Dmin) of the respective color images were measured by means of a Macbeth (RD-519) reflection densitometer. The results are shown in Table 9.

TABLE 9

| Photosensitive material | Compound of invention | | Heating at 90° C. for 25 sec. Dmax | Dmin | Heating at 95° C. for 25 sec. Dmax | Dmin |
|---|---|---|---|---|---|---|
| 301 | 315 | Yellow | 2.12 | 0.15 | 2.16 | 0.17 |
| | | Magenta | 2.15 | 0.14 | 2.19 | 0.17 |
| | | Cyan | 2.20 | 0.14 | 2.24 | 0.16 |
| 302 | 331 | Yellow | 2.10 | 0.15 | 2.14 | 0.17 |
| | | Magenta | 2.15 | 0.16 | 2.20 | 0.20 |
| | | Cyan | 2.23 | 0.15 | 2.28 | 0.18 |
| 303 | 339 | Yellow | 2.09 | 0.16 | 2.12 | 0.20 |
| | | Magenta | 2.10 | 0.16 | 2.14 | 0.19 |
| | | Cyan | 2.20 | 0.15 | 2.23 | 0.17 |
| 304 (control) | — | Yellow | 2.14 | 0.17 | 2.25 | 0.32 |
| | | Magenta | 2.18 | 0.15 | 2.24 | 0.36 |
| | | Cyan | 2.23 | 0.15 | 2.38 | 0.28 |
| 305 (comparison) | (d) | Yellow | 1.82 | 0.20 | 2.03 | 0.26 |
| | | Magenta | 1.90 | 0.18 | 2.07 | 0.25 |
| | | Cyan | 2.01 | 0.19 | 2.15 | 0.22 |

As evident from the data in Table 9, the photosensitive materials containing the compounds of the present invention experience a smaller increase of Dmax and Dmin when the developing temperature is raised by 5 degrees. The control material free of the compound of the present invention produces markedly increased fog. The comparative material containing compound (d) is increased in both fog and fog increase as compared with the present materials. It is thus evident that the compounds of the present invention have great temperature conpensation effect.

EXAMPLE 10

This example illustrates a dye-fixing element having added thereto a compound falling within the scope of the invention.

A gelatin dispersion of basic zinc carbonate was prepared by combining 4% aqueous gelatin solution with 12.5 grams of basic zinc carbonate and 2 grams of a surface-active agent of the formula:

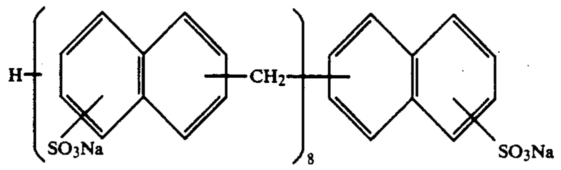

The mixture was ground for 30 minutes in a ball mill filled with glass beads having an average diameter of 0.75 mm. Filtration of the glass beads resulted in a gelatin dispersion of basic zinc carbonate.

Using this dispersion as well as the emulsions, dye-providing substances, and additives described in Example 9, photosensitive material No. 321 was prepared as formulated below.

FORMULATION OF PHOTOSENSITIVE MATERIAL NO. 321

Sixth layer
gelatin (coating weight 1000 $mg/m^2$)
hardener*3 (coating weight 20 $mg/m^2$)
silica*5 (coating weight 100 $mg/m^2$)
basic zinc carbonate (coating weight 600 $mg/m^2$)
Fifth layer: Green-sensitive emulsion layer
silver chlorobromide emulsion (bromine 50 mol %, coating weight 400 $mg/m^2$ of Ag)
sulfamide compound*6 (coating weight 20 $mg/m^2$)
sensitizing dye D-1 (coating weight $10^{-6}$ $mol/m^2$)
hardener*3 (coating weight 20 $mg/m^2$)
yellow dye-providing substance (A) (coating weight 500 $mg/m^2$)
gelatin (coating weight 600 $mg/m^2$)
high-boiling solvent*4 (coating weight 800 $mg/m^2$)
surface-active agent*2 (coating weight 100 $mg/m^2$)
Fourth layer: Intermediate layer
gelatin (coating weight 800 $mg/m^2$)
hardener*3 (coating weight 16 $mg/m^2$)
Third layer: Red-sensitive emulsion layer
silver chlorobromide emulsion (bromine 80 mol %, coating weight 300 $mg/m^2$ of Ag)
sulfamide compound*6 (coating weight 13 $mg/m^2$)
silver benzotriazole emulsion (coating weight 10 $mg/m^2$ of Ag)
sensitizing dye D-2 (coating weight $8\times10^{-7}$ $mol/m^2$)
hardener*3 (coating weight 20 $mg/m^2$)
silver acetylene (coating weight 50 $mg/m^2$)
magenta dye-providing substance (B) (coating weight 320 $mg/m^2$)
gelatin (coating weight 500 $mg/m^2$)
high-boiling solvent*1 (coating weight 600 $mg/m^2$)
surface-active agent*2 (coating weight 100 $mg/m^2$)
Second layer: Intermediate layer
gelatin (coating weight 800 $mg/m^2$)
hardener*3 (coating weight 16 $mg/m^2$)
First layer: Infrared-sensitive emulsion layer
silver chlorobromide emulsion (bromine 50 mol %, coating weight 300 $mg/m^2$ of Ag)
sulfamide compound*6 (coating weight 13 $mg/m^2$)
silver benzotriazole emulsion (coating weight 100 $mg/m^2$ of Ag)
sensitizing dye D-3 (coating weight $10^{-8}$ $mol/m^2$)
hardener*3 (coating weight 16 $mg/m^2$)
silver acetylene (coating weight 50 $mg/m^2$)
cyan dye-providing substance (C) (coating weight 320 $mg/m^2$)
gelatin (coating weight 500 $mg/m^2$)
high-boiling solvent*4 (coating weight 600 $mg/m^2$)
surface-active agent*2 (coating weight 100 $mg/m^2$)
Support (polyethylene terephthalate 100 μm thick)

Note: The asterisked substances (*1-6) and other substances are the same as in Formulation of Example 9.

A dye-fixing material having an image-receiving layer was prepared.

First, 15 grams of the polymer used in preparing the dye-fixing material of Example 9 was dissolved in 200 ml of water and then combined with 100 grams of 10% lime-treated gelatin, 8 grams of guanidine picolinate, and 30 grams of a gelatin dispersion of compound No. 315 of the present invention dispersed by the same method as in Example 9.

The mixture was evenly spread on a paper substrate laminated with polyethylene having titanium dioxide dispersed therein, thereby forming a dye-fixing layer having a uniform wet thickness of 85 μm, which was then dried.

Separately, 0.75 grams of gelatin hardener H-1, 0.25 grams of gelatin hardener H-2, 160 ml of water, and 100 grams of 10% lime-treated gelatin were evenly mixed. The mixture was uniformly coated on the dye-fixing layer to a wet film thickness of 60 μm. After drying, there was obtained a dye-fixing material.

Using photosensitive material No. 321 and the aboveprepared dye-fixing material, the procedure of Example 9 was followed. The results are shown below.

TABLE 10

| | Photosensitive material No. 321 | | | |
|---|---|---|---|---|
| | Heating at 90° C. for 25 sec. | | Heating at 95° C. for 25 sec. | |
| | Dmax | Dmin | Dmax | Dmin |
| Yellow | 1.98 | 0.13 | 2.02 | 0.15 |
| Magenta | 2.12 | 0.15 | 2.15 | 0.17 |
| Cyan | 2.24 | 0.16 | 2.27 | 0.20 |

As seen from the data of Table 10, the compound of the present invention has an enhanced temperature compensation effect.

We claim:

1. A process for forming an image comprising a step of heating a heat-developable photosensitive material containing a silver halide in the presence of a compound selected from the group consisting of compounds of general formula (I-II):

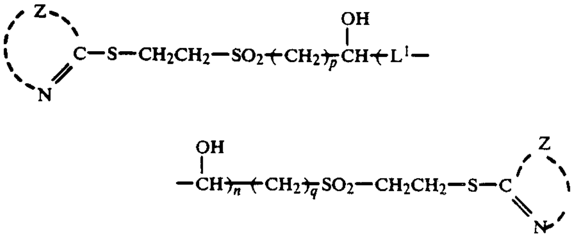

wherein Z represents a group of nonmetallic atoms necessary to complete a phenyltetrazole ring in which the phenyl radical has attached thereto a substituent selected from the group consisting of:

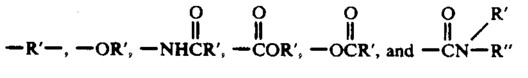

wherein R′ is a substituted or unsubstituted alkyl radical having 3 to 20 carbon atoms or a substituted or unsubstituted aryl radical, and R″ is a hydrogen atom or a radical as defined for R′, $L^1$ is a valence bond or a substituted or unsubstituted divalent radical, p and q each are an integer of 1 or 2, and n is an integer of 0 or 1;

compounds of general formula (II—II):

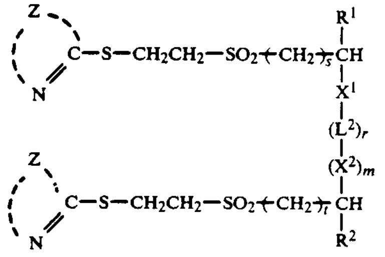

wherein Z represents a group of nonmetallic atoms necessary to complete a phenyltetrazole ring in which the phenyl radical has attached thereto a substituent selected from the group consisting of:

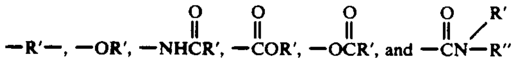

wherein R′ is a substituted or unsubstituted alkyl radical having 3 to 20 carbon atoms or a substituted or unsubstituted aryl radical, and R″ is a hydrogen atom or a radical as defined for R′, $R^1$ and $R^2$ may be the same or different and are individually selected from a hydrogen atom and an alkyl radical having 1 to 4 carbon atoms, s and t each are an integer of 0 to 3 and may be the same or different, $X^1$ and $X^2$ may be the same or different and individually selected from an ester linkage, a substituted or unsubstituted amide linkage, and an ether linkage, $L^2$ is selected from an alkylene, phenylene, and xylylene radical, when $X^1$ and $X^2$ are amide linkages, the substituents on the nitrogen may be bonded to form a heterocyclic ring together with parts of $L^2$, $X^1$, and $X^2$, and m and r each are an integer of 0 or 1; and compounds of general formula (III-I):

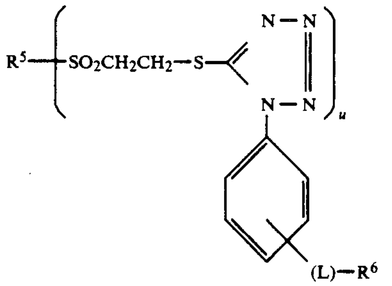

wherein u is an integer of 1 or 2, $R^5$ represents a substituted or unsubstituted alkyl, cycloalkyl, aralkyl, or phenyul radical when u is 1, and $R^5$ represents a substituted or unsubstituted phenylene or alkylene radical when u is 2, $R^6$ represents a substituted or unsubstituted alkyl having at least 3 carbon atoms or a cycloalkyl radical, and —(L)13 represents a valence bond or

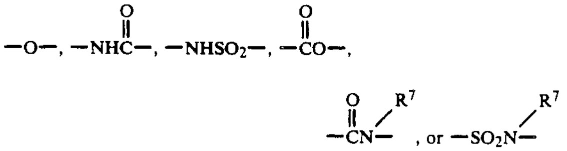

wherein $R^7$ is selected from a hydrogen atom and the radicals defined for $R^6$ and may be the same as or different from $R^6$.

2. The image forming process of claim 1 wherein the heat-developable photosensitive material further comprises a dye-providing substance which produces or releases a mobile dye in proportion or counter-proportion to the reducing reaction of the silver halide to silver.

3. The image forming process of claim 1 wherein said compound is of the general formula (I-II).

4. The image forming process of claim 1, wherein said compound is of the general formula (II—II).

5. The image forming process of claim 1, wherein said compound is of the general formula (III-I).

* * * * *

UNITED STATES PATENT AND TRADEMARK OFFICE

CERTIFICATE OF CORRECTION

PATENT NO. : 4,983,494

DATED : January 8m 1991

INVENTOR(S) : Hiroshi Kitaguchi, et al.

It is certified that error appears in the above-identified patent and that said Letters Patent is hereby corrected as shown below:

Column 84, line 35, "13" should read--a--.

Signed and Sealed this

Twenty-first Day of July, 1992

*Attest:*

DOUGLAS B. COMER

*Attesting Officer*

*Acting Commissioner of Patents and Trademarks*

UNITED STATES PATENT AND TRADEMARK OFFICE

CERTIFICATE OF CORRECTION

PATENT NO. : 4,983,494

DATED : January 8, 1991

INVENTOR(S) : Kitaguchi, et al

It is certified that error appears in the above-indentified patent and that said Letters Patent is hereby corrected as shown below:

Column 84, line 35, "13" should read --▬--.

This Certificate supersedes Certificate of Correction issued July 21, 1992.

Signed and Sealed this

Seventeenth Day of August, 1993

Attest:

BRUCE LEHMAN

*Attesting Officer* *Commissioner of Patents and Trademarks*